(12) United States Patent
Hongu et al.

(10) Patent No.: US 11,528,404 B2
(45) Date of Patent: Dec. 13, 2022

(54) LENS CONTROL APPARATUS, CONTROL METHOD, AND STORAGE MEDIUM

(71) Applicant: CANON KABUSHIKI KAISHA, Tokyo (JP)

(72) Inventors: Hideyasu Hongu, Yokohama (JP); Makoto Yokozeki, Yokohama (JP); Kazunori Ishii, Yokohama (JP); Atsushi Kato, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/993,042

(22) Filed: Aug. 13, 2020

(65) Prior Publication Data

US 2021/0058543 A1  Feb. 25, 2021

(30) Foreign Application Priority Data

Aug. 23, 2019 (JP) .............................. JP2019-153206
Aug. 23, 2019 (JP) .............................. JP2019-153207
Aug. 23, 2019 (JP) .............................. JP2019-153208

(51) Int. Cl.
*H04N 5/232* (2006.01)
*G03B 13/36* (2021.01)
*G02B 7/34* (2021.01)
*G03B 3/10* (2021.01)

(52) U.S. Cl.
CPC ..... *H04N 5/23212* (2013.01); *H04N 5/23299* (2018.08)

(58) Field of Classification Search
CPC ........... H04N 5/23212; H04N 5/23299; H04N 5/23219; H04N 5/23245; H04N 5/23209; H04N 5/232122; H04N 5/232125; G03B 13/36; G03B 3/10; G02B 7/34
See application file for complete search history.

(56) References Cited

U.S. PATENT DOCUMENTS

| 5,206,677 | A | 4/1993 | Onuki |
| 6,301,441 | B1 | 10/2001 | Kato |
| 7,003,222 | B1 | 2/2006 | Murakami |
| 10,225,501 | B2 * | 3/2019 | Takinoiri ......... H04N 5/232122 |
| 2004/0057714 | A1 | 3/2004 | Kashiwaba |
| 2005/0128339 | A1 * | 6/2005 | Masuda ............. H04N 5/23209 348/345 |
| 2006/0008265 | A1 * | 1/2006 | Ito .................... H04N 5/232122 396/125 |

(Continued)

FOREIGN PATENT DOCUMENTS

| CN | 101750846 A | 6/2010 |
| CN | 102694974 A | 9/2012 |

(Continued)

*Primary Examiner* — Albert H Cutler
(74) *Attorney, Agent, or Firm* — Canon U.S.A., Inc. IP Division

(57) ABSTRACT

An apparatus includes at least one processor programmed to perform operations of the following units: a focus detection unit configured to detect a defocus amount; and a control unit configured to control a focus lens to move based on the defocus amount, wherein the control unit includes three speed control patterns of acceleration control, constant speed control, and deceleration control, and the speed control patterns are changed based on at least two or more parameters.

20 Claims, 22 Drawing Sheets

CHANGE OF SPEED CONTROL MODE AND CHANGE OF DEFOCUS AMOUNT

(56) References Cited

U.S. PATENT DOCUMENTS

| | | | |
|---|---|---|---|
| 2008/0145043 A1* | 6/2008 | Katayama | H04N 5/23245 396/125 |
| 2013/0010179 A1* | 1/2013 | Takahara | H04N 9/04557 348/E5.045 |
| 2015/0042868 A1 | 2/2015 | Ono | |
| 2015/0092101 A1* | 4/2015 | Yamazaki | H04N 5/232122 348/349 |
| 2015/0296128 A1* | 10/2015 | Saito | H04N 5/36961 348/353 |
| 2018/0059359 A1 | 3/2018 | Hongu | |
| 2018/0143396 A1* | 5/2018 | Watanabe | G02B 7/09 |
| 2018/0299646 A1 | 10/2018 | Pan | |
| 2019/0170968 A1* | 6/2019 | Habe | G02B 7/005 |
| 2021/0006707 A1* | 1/2021 | Xu | H04N 5/23212 |

FOREIGN PATENT DOCUMENTS

| | | |
|---|---|---|
| JP | 2015-087704 A | 5/2015 |
| JP | 2018-036509 A | 3/2018 |

\* cited by examiner

FIG.2

PIXEL STRUCTURE OF NON-IMAGING PLANE PHASE DIFFERENCE METHOD

| R | Gr | R | Gr | R | Gr | R | Gr | R | Gr |
|---|----|---|----|---|----|---|----|---|----|
| Gb | B | Gb | B | Gb | B | Gb | B | Gb | B |

PIXEL STRUCTURE OF IMAGING PLANE PHASE DIFFERENCE METHOD

| R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B | R<br>A | R<br>B | Gr<br>A | Gr<br>B |
|---|---|---|---|---|---|---|---|---|---|---|---|---|---|---|---|---|---|---|---|
| Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B | Gb<br>A | Gb<br>B | B<br>A | B<br>B |

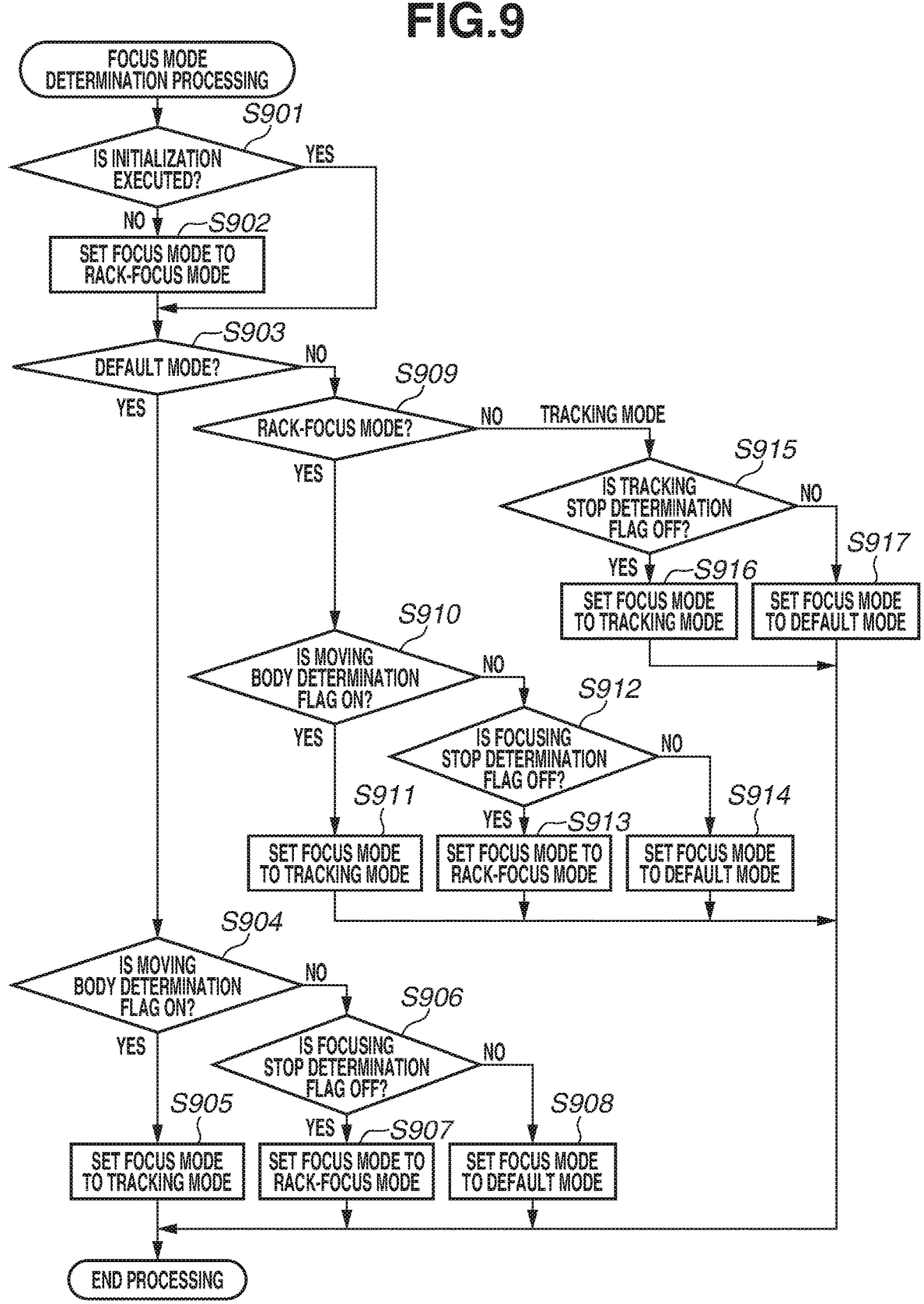

|  | DETERMINATION | SPEED SETTING | RESPONSIVENESS SETTING | REMARK |
|---|---|---|---|---|
| DEFAULT | FOCUSING IS STOPPED | – | – | – |
| RACK-FOCUS MODE | RESTART FLAG OBJECT CHANGE FLAG | CHANGE ACCORDING TO MENU SETTING | CHANGE ACCORDING TO MENU SETTING | – |
| TRACKING MODE | MOVING BODY DETERMINATION FLAG | CHANGE DEPENDING ON MOVING BODY | DRIVE PROMPTLY | STOP FOR RESPONSE TIME ONLY WHEN OBJECT IS CHANGED |

STATE TRANSITION DIAGRAM OF SPEED CONTROL MODE

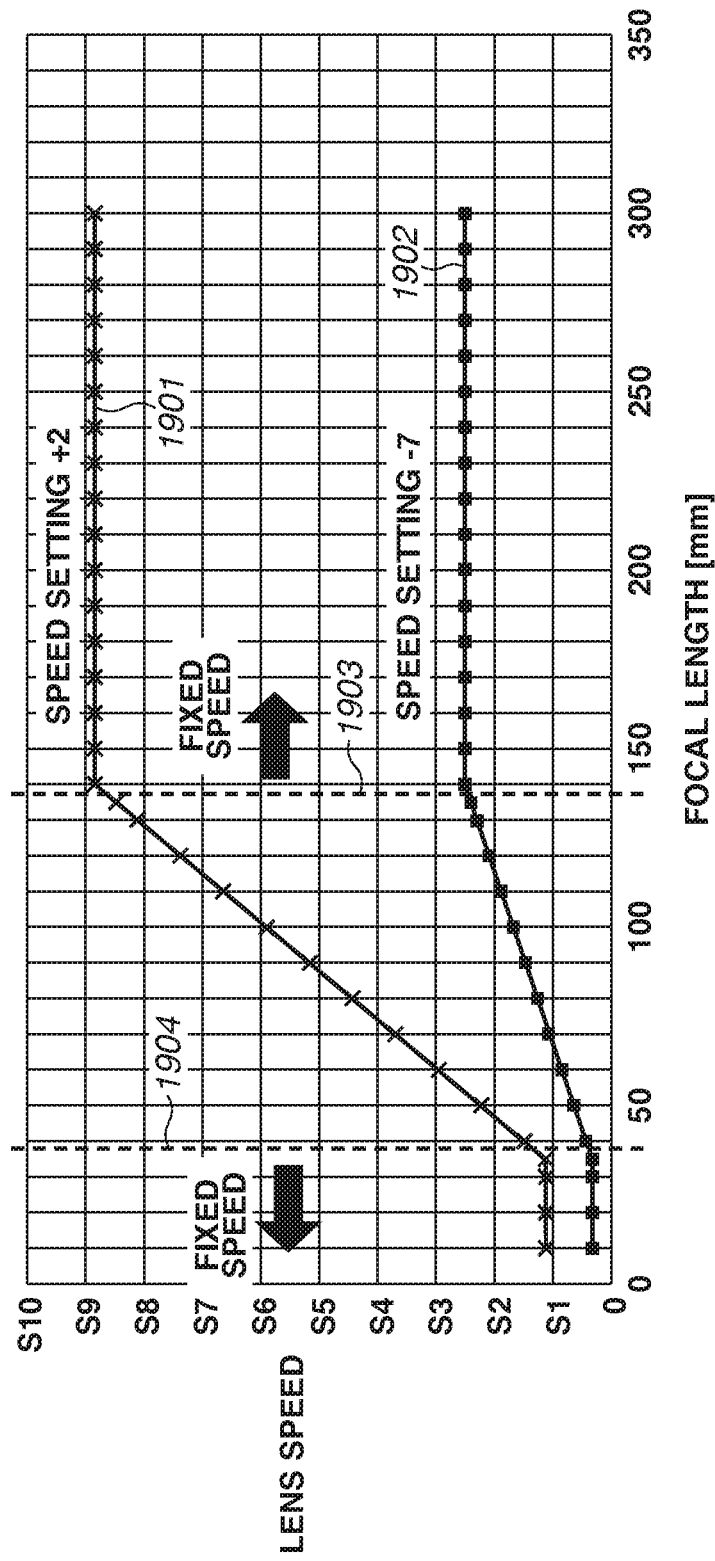

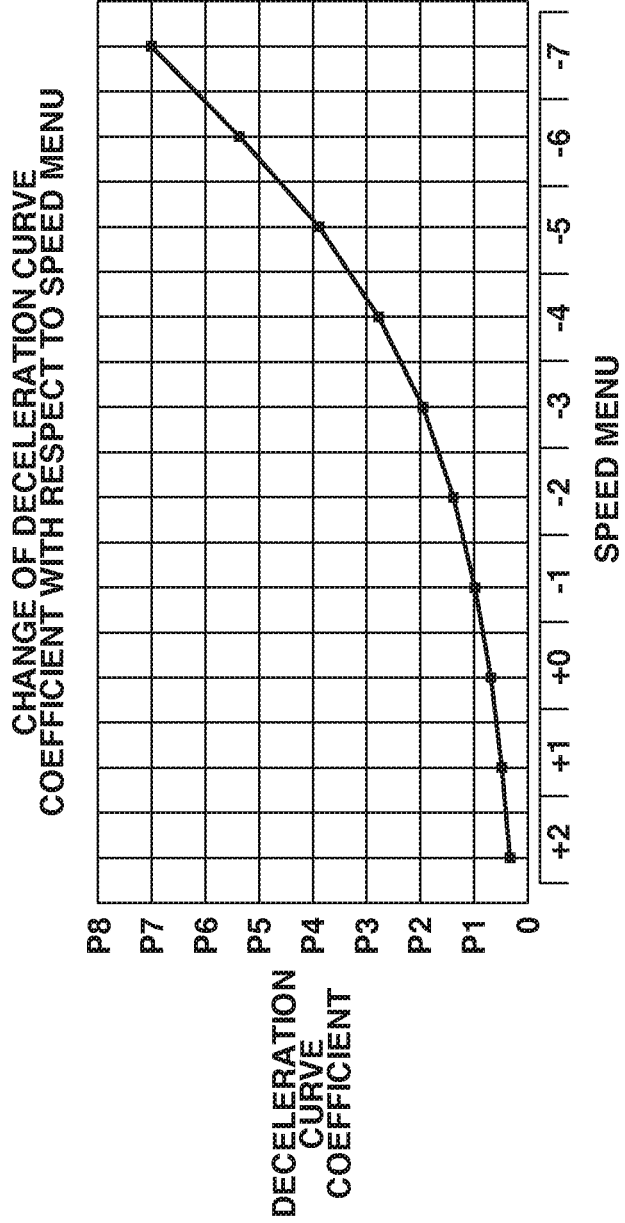

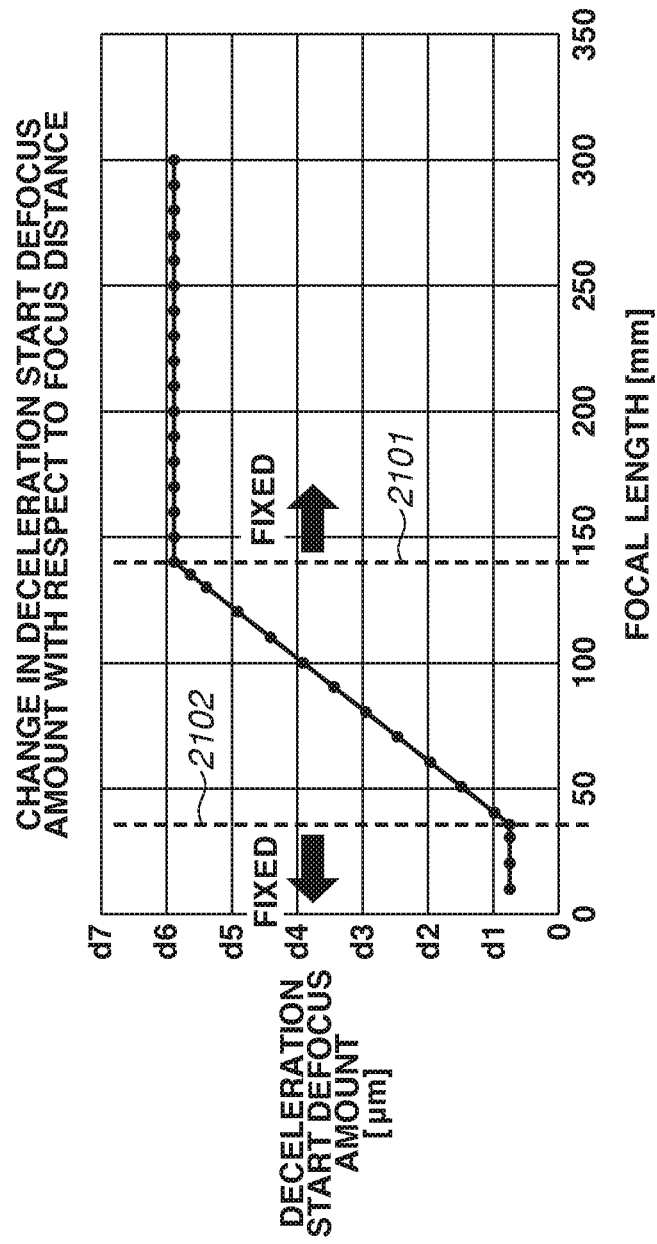

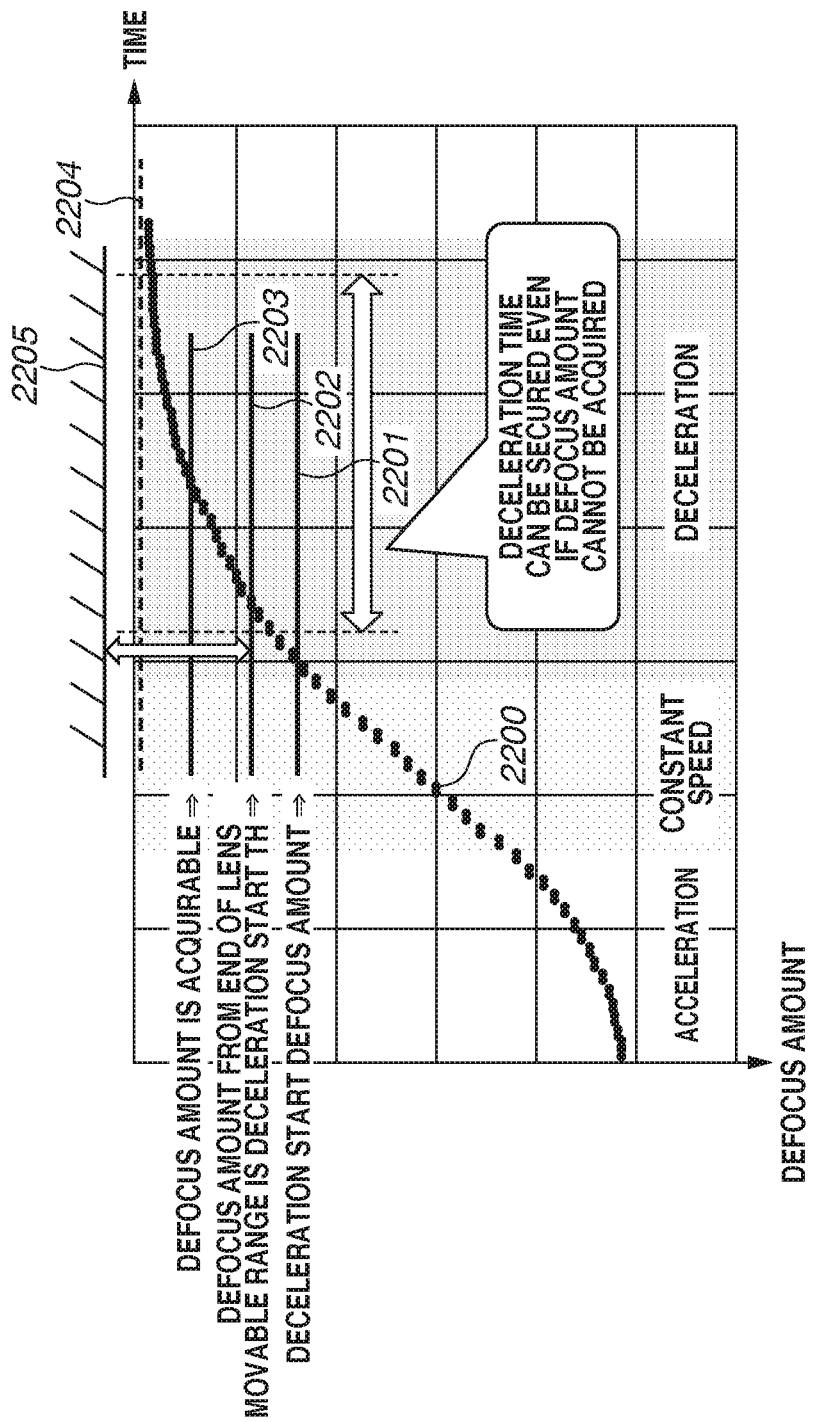

LENS CONTROL APPARATUS, CONTROL METHOD, AND STORAGE MEDIUM

BACKGROUND

Field of the Disclosure

The aspect of the embodiments relates to a lens control apparatus for controlling driving of a focus lens, a control method of a lens control apparatus, and a storage medium storing a program for controlling a lens control apparatus.

Description of the Related Art

Conventional, focus detection techniques employing a phase difference detection method are known. In such methods, an image sensor receives a pair of light fluxes having parallax which has passed through an imaging optical system including a focus lens, and converts the pair of light fluxes into a pair of imaging signals through photoelectric conversion. Then, focus detection is executed based on the pair of imaging signals. In a technique discussed in Japanese Patent Laid-Open No. 2018-36509, change of a moving body or an object is detected based on a result of the focus detection, and a tracking autofocus (AF) control mode and a rack-focus AF control mode are switched from one to another to implement lens driving that reduces occurrence of defocusing. In the rack-focus AF control, a lens is driven and moved to an in-focus position based on a result of the focus detection.

However, Japanese Patent Laid-Open No. 2018-36509 only describes deceleration control when a lens is brought into an in-focus state and does not describe control with respect to when the lens driving is started or being executed. Thus, in lens control in a period from the beginning to the end of autofocusing operation, a focus may not be shifted smoothly and seamlessly when a target object is changed from one to another. As a result, the change in defocusing may look unnatural to a user.

SUMMARY OF THE DISCLOSURE

The aspect of the embodiments is directed to a technique which realizes seamless rack-focusing for smoothly shifting a focus on an object changing from one to another and a smooth autofocusing operation which makes a viewer feel comfortable, without depending on a result of focus detection (as in a conventional techniques), in lens control in a period from the beginning to the end of autofocusing operation.

According to the aspect of the embodiments, provided is an apparatus comprising: at least one processor programmed to perform operations of the following units: a focus detection unit configured to detect a defocus amount; and a control unit configured to control a focus lens to move based on the defocus amount, wherein the control unit includes three speed control patterns of acceleration control, constant speed control, and deceleration control, and the speed control patterns are changed based on at least two or more parameters.

Further, according to the aspect of the embodiments, provided is a control method of an apparatus comprising: detecting a defocus amount through focus detection; and controlling a focus lens to move based on the defocus amount, wherein the controlling includes three speed control patterns of acceleration control, constant speed control, and deceleration control, and the speed control patterns are changed based on at least two or more parameters.

Furthermore, according to the aspect of the embodiments, provided is a non-transitory storage medium storing a program for controlling an apparatus, wherein the program executes a process via a computer, the process including: detecting a defocus amount through focus detection; and controlling a focus lens to move based on the defocus amount, wherein the controlling includes three speed control patterns of acceleration control, constant speed control, and deceleration control, and the speed control patterns are changed based on at least two or more parameters.

Further features of the disclosure will become apparent from the following description of exemplary embodiments with reference to the attached drawings.

BRIEF DESCRIPTION OF THE DRAWINGS

FIG. 2 is a diagram illustrating a pixel configuration of an imaging plane phase difference detection method according to the present exemplary embodiment.

FIG. 9 is a flowchart illustrating focus mode determination processing according to the present exemplary embodiment.

FIG. 19 is a graph illustrating change of constant speed depending on a focal distance and the speed menu according to the present exemplary embodiment.

FIG. 20 is a graph illustrating change of a deceleration curve coefficient depending on the speed menu according to the present exemplary embodiment.

FIG. 21 is a graph illustrating change of a deceleration start defocus amount depending on a focal distance according to the present exemplary embodiment.

FIG. 22 is a diagram illustrating deceleration control according to the present exemplary embodiment, executed when a defocus amount cannot be acquired.

DESCRIPTION OF THE EMBODIMENTS

Embodiments of the disclosure will now be described in detail in accordance with the accompanying drawings.

First Exemplary Embodiment

<Configurations of Lens and Camera>

Figure 1:
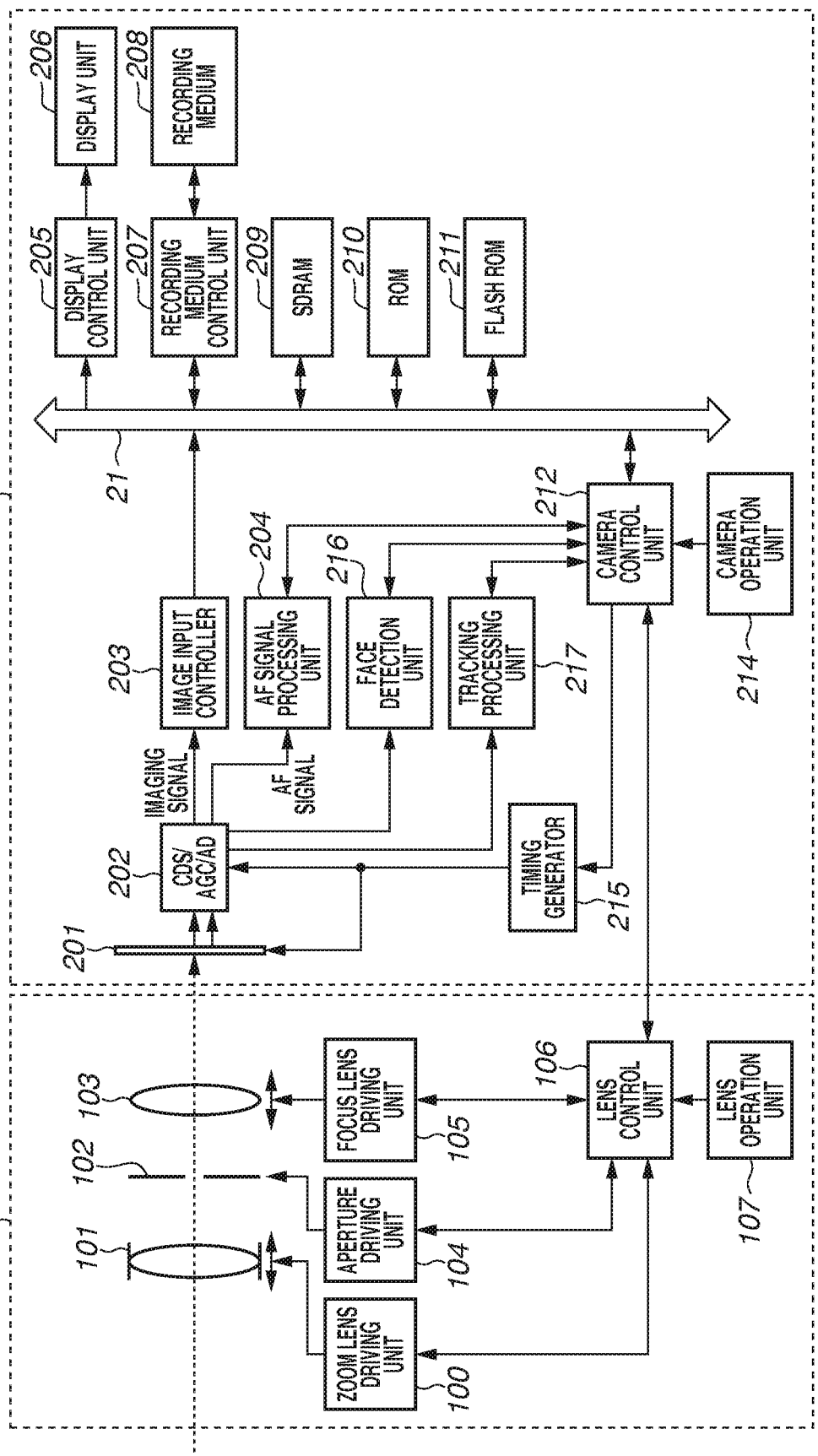
FIG. 1 is a block diagram illustrating configurations of a camera and a lens according to a present exemplary embodiment.

FIG. 1 is a block diagram illustrating configurations of a lens and a main body of a lens-interchangeable type camera according to a first exemplary embodiment of the disclosure.

As illustrated in FIG. 1, a lens 10 and a camera 20 according to the present exemplary embodiment transmit information through a lens control unit 106 which generally controls entire operation of the lens 10 and a camera control unit 212 which generally controls entire operation of the camera 20.

First, a configuration of the lens 10 will be described. The lens 10 includes a zoom lens 101, an aperture 102, a focus lens 103, a zoom lens driving unit 100, an aperture driving unit 104, a focus lens driving unit 105, the lens control unit 106, and a lens operation unit 107. The zoom lens 101, the aperture 102, and the focus lens 103 constitute an imaging optical system of the present exemplary embodiment. The zoom lens 101 is driven by the zoom lens driving unit 100. The lens control unit 106 controls the zoom lens 101 via the zoom lens driving unit 100 to control image magnification of an object image formed on an image sensor 201 described below. The aperture 102 is driven by the aperture driving unit 104. The lens control unit 106 controls the aperture 102 via the aperture driving unit 104 to control an amount of light incident on the below-described image sensor 201. The focus lens 103 is driven by the focus lens driving unit 105. The lens control unit 106 controls a position of the focus lens 103 via the focus lens driving unit 105 to control a position of a focal point of an image formed on the below-described image sensor 201. When a user performs operation via the lens operation unit 107, the lens control unit 106 executes control in response to the user operation. The lens control unit 106 controls the aperture driving unit 104 and the focus lens driving unit 105 based on a control instruction or control information received from the camera control unit 212 described below. Further, the lens control unit 106 transmits lens control information to the camera control unit 212.

Next, a configuration of the camera 20 will be described. The camera 20 is configured to acquire an imaging signal from a light flux that has passed through the imaging optical system of the lens 10.

The image sensor 201 includes a charge coupled device (CCD) sensor or a complementary metal-oxide semiconductor (CMOS) sensor. The light flux that has passed through the imaging optical system forms an image on a light receiving surface of the image sensor 201, and is photoelectrically converted by a photodiode into a signal charge depending on an incident light amount. Based on a driving pulse transmitted from a timing generator 215 in response to an instruction from the camera control unit 212, the signal charge accumulated in each of photodiodes is sequentially read from the image sensor 201 as a voltage signal corresponding to the signal charge.

In order to execute focus detection of an imaging plane phase difference method, the image sensor 201 includes two photodiodes (photoelectric conversion elements) in each pixel portion (i.e., a pixel structure on a lower part in FIG. 2). A light flux is separated by micro-lenses (not illustrated), and light fluxes having parallax are received by the two photodiodes, so that two signals used for imaging and autofocusing can be acquired therefrom. The micro-lenses are two-dimensionally arrayed in the image sensor 201. In other words, imaging plane phase difference autofocus (AF) can be implemented by using a pair of focus detection signals A and B generated by photoelectric conversion of the light fluxes that have passed through different pupil regions of the imaging optical system. The signals A and B output from two photodiodes are added to constitute an imaging signal, and the signals A and B output from the respective two photodiodes constitute a pair of AF image signals. Based on the AF image signals, an AF signal processing unit 204 described below executes correlation calculation on the two image signals to obtain an image displacement amount and various kinds of reliability information.

The imaging signal and the AF image signal read from the image sensor 201 are input to a correlated double sampling/auto gain control/analog-to-digital (CDS/AGC/AD) converter 202, and correlated double sampling for eliminating reset noise, gain adjustment, and digitization of the signals are executed. The CDS/AGC/AD converter 202 outputs the imaging signal to an image input controller 203 and the AF image signal to the AF signal processing unit 204, respectively.

The image input controller 203 stores the imaging signal output from the CDS/AGC/AD converter 202 in a synchronous dynamic random access memory (SDRAM) 209. An image of the imaging signal stored in the SDRAM 209 is displayed on a display unit 206 by a display control unit 205 via a bus 21. Further, in a mode for recording the imaging signal, the imaging signal is recorded in a recording medium 208 by a recording medium control unit 207. A control program to be executed by the camera control unit 212 and various kinds of data for executing control are stored in a read only memory (ROM) 210 connected to the camera control unit 212 via the bus 21. Various kinds of setting information about the operation of the camera 20 such as user setting information are stored in a flash ROM 211.

Based on the two AF image signals output from the CDS/AGC/AD converter 202, the AF signal processing unit 204 executes correlation calculation to obtain an image displacement amount and reliability information (e.g., a two-image coincidence degree, a two-image steepness degree, contrast information, saturation information, and flaw information). The calculated image displacement amount and the reliability information are output to the camera control unit 212. Based on the obtained image displacement amount and the reliability information, the camera control unit 212 notifies the AF signal processing unit 204 of change in settings for calculating these pieces of information. For example, in a case where the image displacement amount is large, an area for executing correlation calculation is set wider, or a type of band pass filter is changed based on the contrast information.

A face detection unit 216 executes known face detection processing on the imaging signal to detect a human face in an imaging screen. The face detection unit 216 transmits a detection result to the camera control unit 212. Based on the detection result, the camera control unit 212 transmits information to the AF signal processing unit 204 to add a face frame in an area including the face in the imaging screen. In a case where a plurality of human faces are detected by the face detection unit 216, a main face determination processing unit places priorities based on positions and sizes of the faces or based on an instruction from a user, so that a face on which the main face determination processing unit places the highest priority is determined as a major face. For example, determination is executed so that the highest priority is placed on a face selected by a user instruction, and the higher priority is placed on a face located closer to the center of the screen, and a face that is larger in size. However, a method different from the above-described method can be used as long as a face can be detected and a major face can be determined.

For example, the following methods have been disclosed as the methods for executing the face detection processing. In one method, a complexion region is extracted from gradation colors of pixels represented by image data, and a face is detected based on a matching degree of the complexion region and a facial contour plate prepared previously. In another method, face detection is executed by extracting feature points of a face such as eyes, a nose, and a mouth using a known pattern recognition technique. In the present exemplary embodiment, a method of executing the face detection processing is not limited to the above, and any method can be employed.

A tracking processing unit 217 acquires images captured at different times from the imaging signals output from the CDS/AGC/AD converter 202, extracts a feature amount of each of the images, searches for a region having the similar feature amount, and tracks the region. At the time of initial operation when a reference image is not registered, a partial region of the image is used as a reference image based on information acquired from a camera operation unit 214 or information about a detection result acquired by the face detection unit 216. Then, color information is extracted from the reference image and registered as a feature amount of the object as a tracking target. Based on the extracted feature amount of the object as the tracking target, matching processing is executed with respect to an image of the imaging signal in a current frame and the reference image. By executing the matching processing of the respective images, an area, in the image of the imaging signal in the current frame, having the highest correlation with the reference image is extracted as a particular target area. Then, depending on whether a correlation degree is high, the tracking processing unit 217 determines whether to continue to track the area. Further, the tracking processing unit 217 obtains a tracking state based on the correlation degree as a reliability, and transmits the reliability to the camera control unit 212, so that the reliability is used as a parameter of the AF control processing.

The camera control unit 212 exchanges information with the entire camera 20 to execute control processing. Based on a user operation input to the camera operation unit 214, the camera control unit 212 executes various camera functions, such as to turn ON/OFF power, to change the settings, to start recording operation, to start AF control, and to check recorded video image in addition to executing the internal processing of the camera 20. Further, as described above, the camera control unit 212 exchanges information with the lens control unit 106 of the lens 10, transmits the control instruction or control information of the lens 10, and acquires internal information of the lens 10.

<Moving Image Capturing Processing>

Figure 3:
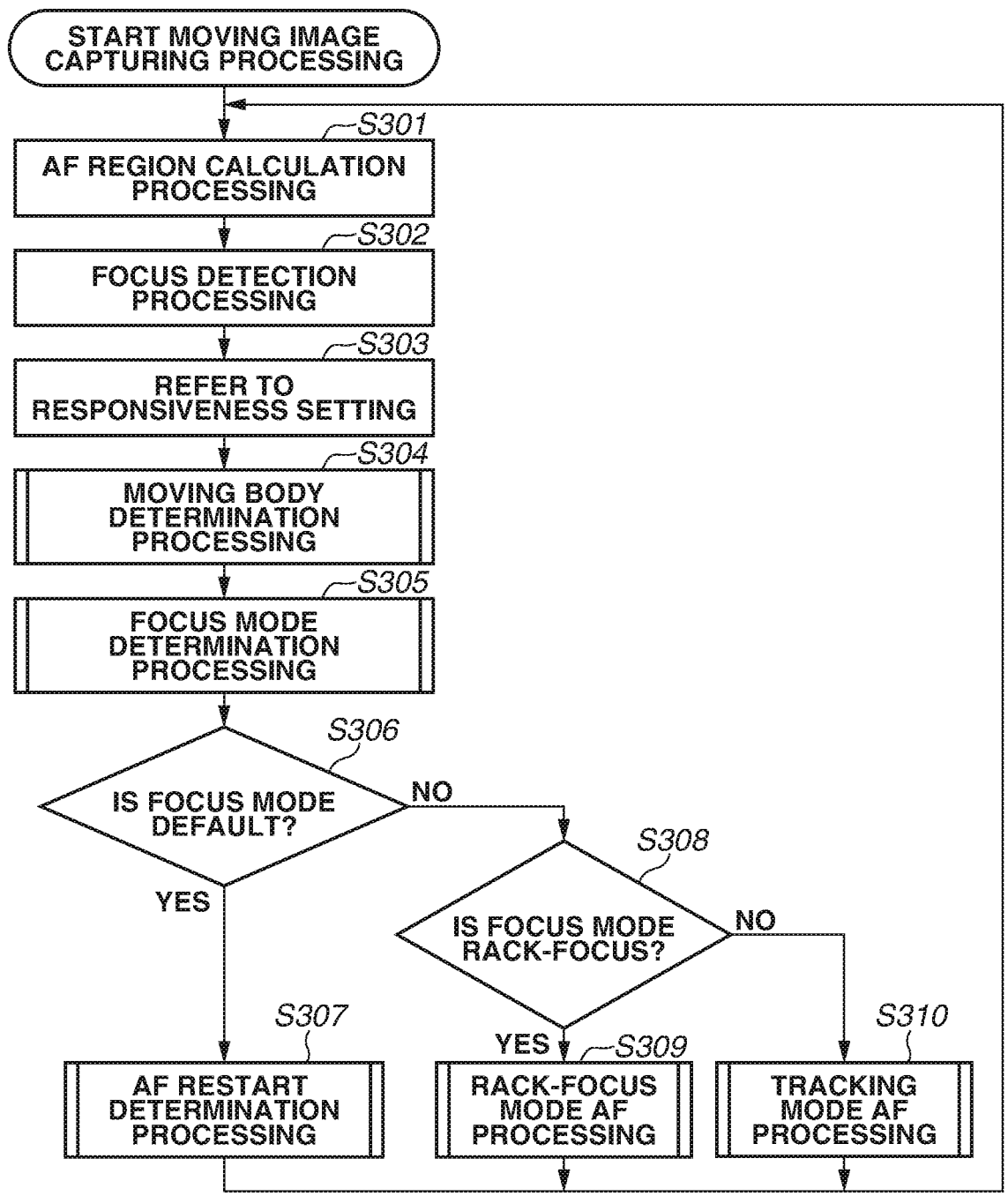
FIG. 3 is a flowchart illustrating moving image capturing processing according to the present exemplary embodiment.

Next, moving image capturing processing executed by the camera 20 according to the present exemplary embodiment will be described with reference to FIG. 3.

In the present exemplary embodiment, recording of a moving image is started or ended by the user pressing a moving image recording switch. However, recording may be started or ended by another method such as a method using a changeover switch.

If a recording instruction of a moving image is input through the moving image recording switch or the like, in step S301, the AF signal processing unit 204 executes AF region calculation processing. Then, the processing proceeds to step S302. The AF region calculation processing is processing for setting a region on an imaging plane from which a signal used for focus detection is acquired.

In step S302, the AF signal processing unit 204 executes focus detection processing. Then, the processing proceeds to step S303. In the focus detection processing, a defocus amount and reliability information are acquired by focus detection using the imaging plane phase difference method. The defocus amount is detected based on the image displacement amount of the pair of image signals described above. The defocus amount according to the present exemplary embodiment is information which indicates how much the focus lens 103 is to be controlled to be driven in a closest distance direction or an infinite distance direction. Reliability information is an index indicating to what extent an image displacement amount is reliable. The reliability can be defined by a coincidence degree fnclvl (function level) of two images of image signals A and B (hereinafter, referred to as a two-image coincidence degree) and steepness of a correlation change amount. For example, details of the imaging plane phase difference focus detection processing are discussed in Japanese Patent Laid-Open No. 2015-87704.

In step S303, in order to control driving of the focus lens 103, the camera control unit 212 refers to a responsiveness setting of the focus lens 103 set by the user.

For example, the user can execute responsiveness setting through a menu screen (not illustrated) of the camera 20 to select responsiveness for driving the focus lens 103 when imaging is executed. The responsiveness is a degree of response speed in driving the focus lens 103, and one of the indexes indicating the responsiveness is a length of response time, i.e., time taken to drive the focus lens 103. The longer the response time is, the lower the responsiveness becomes. The shorter the response time is, the higher the responsiveness becomes. For example, in the responsiveness setting according to the present exemplary embodiment, the responsiveness is selected from 7 phases ranging from +3 to −3. The camera control unit 212 refers to the response time of the focus lens 103 corresponding to the responsiveness selected by the user, and changes a time taken to restart the lens in step S307 and a time taken for starting focusing operation when an object is changed in the tracking mode AF processing in step S310.

In step S304, the camera control unit 212 executes moving body determination processing. In the moving body determination processing, the camera control unit 212 determines presence or absence of a movement of an imaging target object in an optical axis direction. Details will be described later with reference to FIG. 8.

In step S305, the camera control unit 212 determines a focus mode to be set. Details will be described later with reference to FIGS. 9, 10A, and 10B.

In step S306, the camera control unit 212 determines whether the focus mode determined in step S305 is a default mode. If the focus mode is a default mode (YES in step S306), the processing proceeds to step S307.

In step S307, the camera control unit 212 executes AF restart determination processing. Details will be described later with reference to FIG. 4.

In step S306, if the focus mode is not a default mode (NO in step S306), the processing proceeds to step S308.

In step S308, if the camera control unit 212 determines that the focus mode is a rack-focus mode (YES in step S308), the processing proceeds to step S309. In step S309, the camera control unit 212 performs control to execute the rack-focus mode AF processing. Details will be described later with reference to FIG. 5. In step S308, if the focus mode is not the rack-focus mode (NO in step S308), the processing proceeds to step S310. In step S310, the camera control unit 212 executes the tracking mode AF processing. Details will be described later with reference to FIG. 11. The above processing will be executed repeatedly until a stop instruction of the moving image capturing is received.

<Overview of Focus Mode>

Figures 10A, 10B:
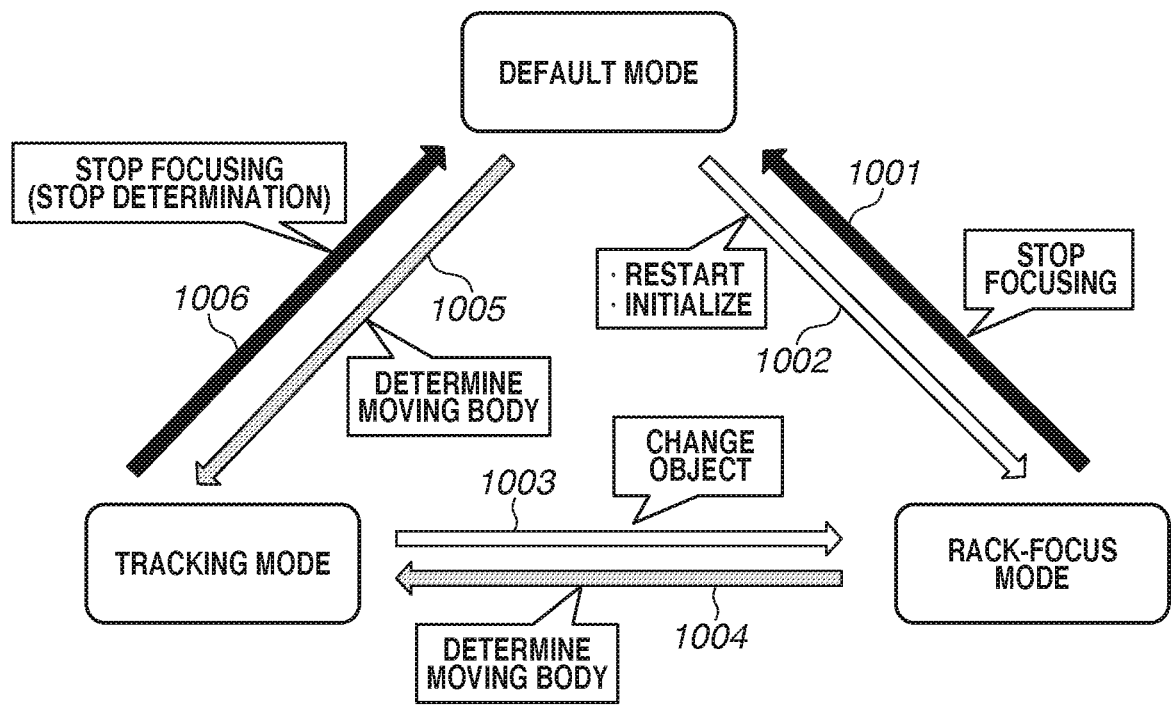
FIGS. 10A and 10B are diagrams illustrating a focus mode according to the present exemplary embodiment.

An overview of each of the focus modes according to the present exemplary embodiment will be described with reference to FIGS. 10A and 10B before respective sub-processing flows are described. The focus mode according to the present exemplary embodiment generally includes three modes of a default mode, a rack-focus mode, and a tracking mode. FIG. 10A is a diagram illustrating a relationship between the focus modes. FIG. 10B is a table illustrating types and features of the focus modes.

The features of the focus modes will be briefly described. The default mode (i.e., a first mode, also referred to as a focusing stop mode) is a mode to shift to from another mode when focusing is stopped.

In the rack-focus mode (i.e., a third mode), a driving speed of the focus lens 103 and a response time for driving the focus lens 103 are set according to a user instruction, and the focus lens 103 is driven based on the setting.

The tracking mode (i.e., a second mode, also referred to as a focus adjustment mode) is a focus mode for controlling the focus lens 103 to track a moving body when the moving body is detected as an object. Thus, the driving speed of the focus lens 103 is set based on a speed of the moving body. In the present exemplary embodiment, as one example of driving control of the focus lens 103 based on the moving body, the camera control unit 212 variably controls the driving speed of the focus lens 103 based on the detected defocus amount. In a case where the detected defocus amount is relatively large, the camera control unit 212 controls to drive the focus lens 103 at a speed faster than a speed in a case where the defocus amount is small.

Transition of the focus modes will be described with reference to FIG. 10A. In the default mode, if the camera control unit 212 determines that the object is a moving body through moving body determination, the default mode is shifted to the tracking mode (1005). In the rack-focus mode, if the camera control unit 212 determines that the object is a moving body through the moving body determination, the rack-focus mode is shifted to the tracking mode (1004).

In the tracking mode, if the camera control unit 212 determines that the object is changed, the tracking mode is shifted to the rack-focus mode (1003).

In the default mode, if the camera control unit 212 determines that the object is not a moving body through the moving body determination and also determines that a defocus amount falls outside a focusing range through AF restart determination, the default mode is shifted to the rack-focus mode (1002).

In the rack-focus mode or the tracking mode, if the camera control unit 212 determines that the focus lens 103 is brought into an in-focus state through focusing stop determination, the focus mode is shifted to the default mode (1001 or 1006).

<Moving Body Determination Processing>

Figure 8:
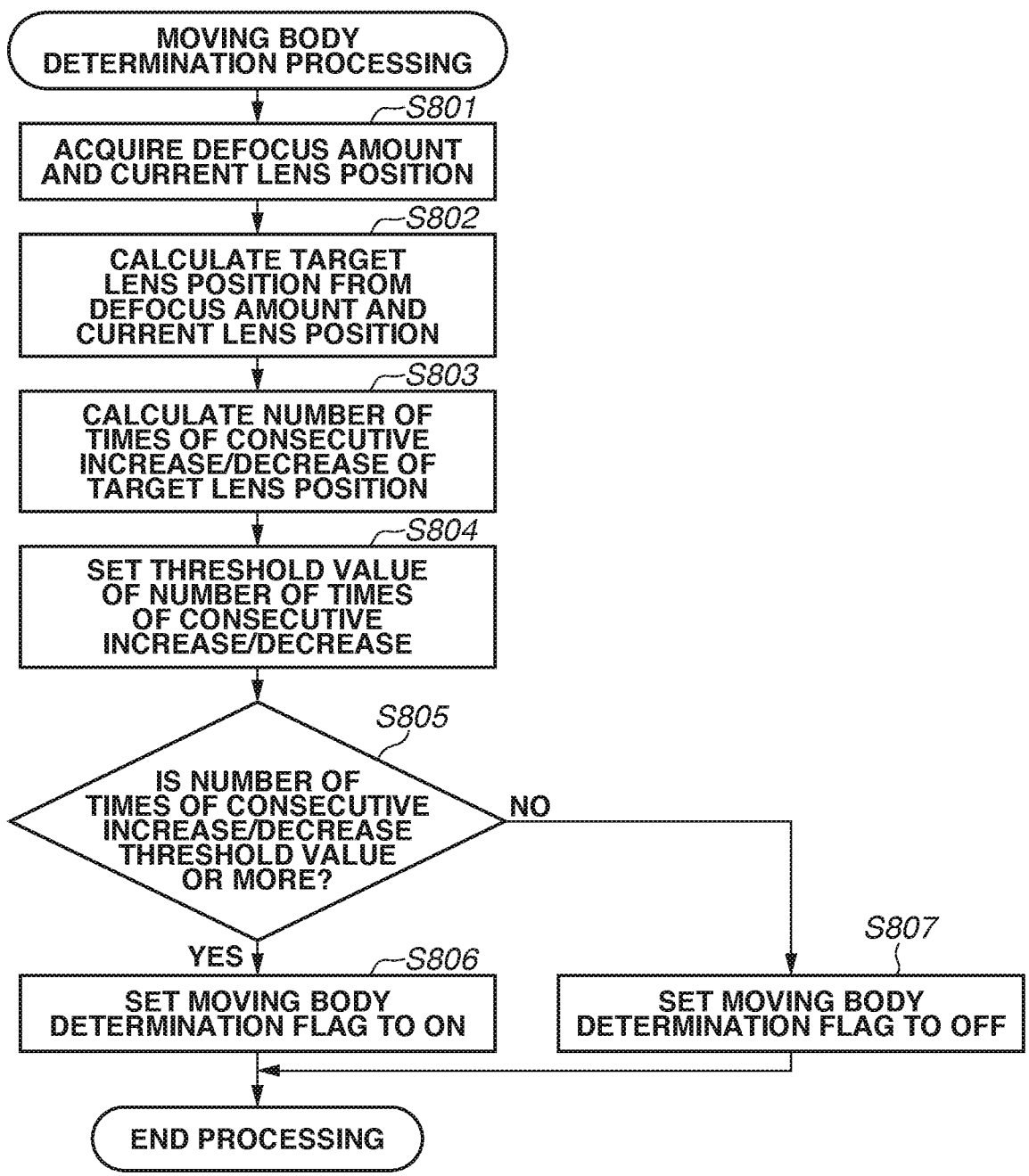
FIG. 8 is a flowchart illustrating moving body determination processing according to the present exemplary embodiment.

The moving body determination processing in step S304 will be described with reference to FIG. 8. In step S801, the camera control unit 212 acquires the defocus amount calculated in step S302. Further, the camera control unit 212 acquires a current position of the focus lens 103 via the lens control unit 106.

In step S802, the camera control unit 212 calculates a target lens position from the defocus amount and the current lens position acquired in step S801. The calculation is executed by the following formulas.

$$\text{Driving Amount [pulse]} = \text{Defocus Amount [mm]} / \text{Lens Sensitivity [pulse/mm]} \quad (1)$$

$$\text{Target Lens Position [pulse]} = \text{Current Lens Position [pulse]} + \text{Driving Amount [pulse]} \quad (2)$$

Through the above calculation, a defocus amount on the imaging plane of the image sensor 201 is converted into the driving amount of the focus lens 103. A calculation method different from the above-described method can be used as long as the target lens position of the focus lens 103 can be calculated.

In addition, depending on an imaging condition, variation occurs in the calculated defocus amount even if the object position and the corresponding position of the focus lens 103 are the same. Thus, two values, i.e., a defocus amount as an actual calculated value and an average of three defocus amounts, are used for calculating the target lens position of the focus lens 103. Further, two values, i.e., an actual value and an average value, are calculated as the target lens position of the focus lens 103.

In step S803, the camera control unit 212 detects continuity of the target lens position (actual value/average value) of the focus lens 103 in the infinite distance direction or the closest distance direction. In the present exemplary embodiment, the number of times of consecutive increase or decrease in the infinite distance direction or the closest distance direction is counted where the infinite distance direction is a plus direction and the closest distance direction is a minus direction.

In step S804, processing for setting a threshold value of the number of times of consecutive increase or decrease is executed. In the present exemplary embodiment, the threshold value is set to 10 times.

In step S805, the camera control unit 212 determines whether the number of times of consecutive increase or decrease is the threshold value or more. If the number of times is the threshold value or more (YES in step S805), the processing proceeds to step S806. If the number of times is less than the threshold value (NO in step S805), the processing proceeds to step S807.

The processing in step S806 is executed if the object is determined as a moving body through the moving body determination, and the camera control unit 212 sets a moving body determination flag to ON and ends the processing.

On the other hand, the processing in step S807 is executed if the object is not determined as a moving body or the focus mode has already been shifted to the tracking mode. Thus, the camera control unit 212 sets the moving body determination flag to OFF and ends the processing.

<Focus Mode Determination Processing>

Determination processing of the focus mode will be described with reference to FIG. 9. In step S901, the camera control unit 212 determines whether initialization is executed. If the initialization is not executed (NO in step S901), the processing proceeds to step S902. In step S902, the focus mode is set to the rack-focus mode. Then, the processing proceeds to step S903. If the initialization is executed (YES in step S901), the processing in step S902 is skipped, and the processing proceeds to step S903. The initialization is executed every time the imaging mode is changed.

In step S903, the camera control unit 212 determines whether the focus mode is the default mode. If the focus mode is the default mode (YES in step S903), the processing proceeds to step S904. If the focus mode is not the default mode (NO in step S903), the processing proceeds to step S909.

In step S904, the camera control unit 212 determines presence or absence of the moving body determination flag. If the moving body determination flag is ON (YES in step S904), the processing proceeds to step S905. In step S905, the camera control unit 212 sets the focus mode to the tracking mode and ends the control processing.

If the moving body determination flag is not ON (NO in step S904), the processing proceeds to step S906. In step S906, the camera control unit 212 determines presence or absence of a focusing stop determination flag. If the focusing stop determination flag is OFF (YES in step S906), the processing proceeds to step S907. In step S907, the camera control unit 212 sets the focus mode to the rack-focus mode and ends the control processing. If the focusing stop determination flag is not OFF (NO in step S906), the processing proceeds to step S908. In step S908, the camera control unit 212 sets the focus mode to the default mode and ends the control processing.

In step S909, the camera control unit 212 determines whether the focus mode is the rack-focus mode. If the focus mode is the rack-focus mode (YES in step S909), the processing proceeds to step S910. If the focus mode is not the rack-focus mode (NO in step S909), the processing proceeds to step S915. In step S910, the camera control unit 212 determines whether the moving body determination flag is ON. If the moving body determination flag is ON (YES in step S910), the processing proceeds to step S911. In step S911, the camera control unit 212 sets the focus mode to the tracking mode and ends the control processing. If the moving body determination flag is not ON (NO in step S910), the processing proceeds to step S912. In step S912, the camera control unit 212 determines whether the focusing stop determination flag is OFF. If the focusing stop determination flag is OFF (YES in step S912), the processing proceeds to step S913. In step S913, the camera control unit 212 sets the focus mode to the rack-focus mode and ends the control processing. If the focusing stop determination flag is not OFF (NO in step S912), the processing proceeds to step S914. In step S914, the camera control unit 212 sets the focus mode to the default mode and ends the control processing.

In step S915, the camera control unit 212 determines whether a tracking stop determination flag is OFF. If the tracking stop determination flag is OFF (YES in step S915), the processing proceeds to step S916. In step S916, the camera control unit 212 sets the focus mode to the tracking mode and ends the control processing. If the tracking stop determination flag is not OFF (NO in step S915), the processing proceeds to step S917. In step S917, the camera control unit 212 sets the focus mode to the default mode and ends the control processing.

<AF Restart Determination>

Figure 4:
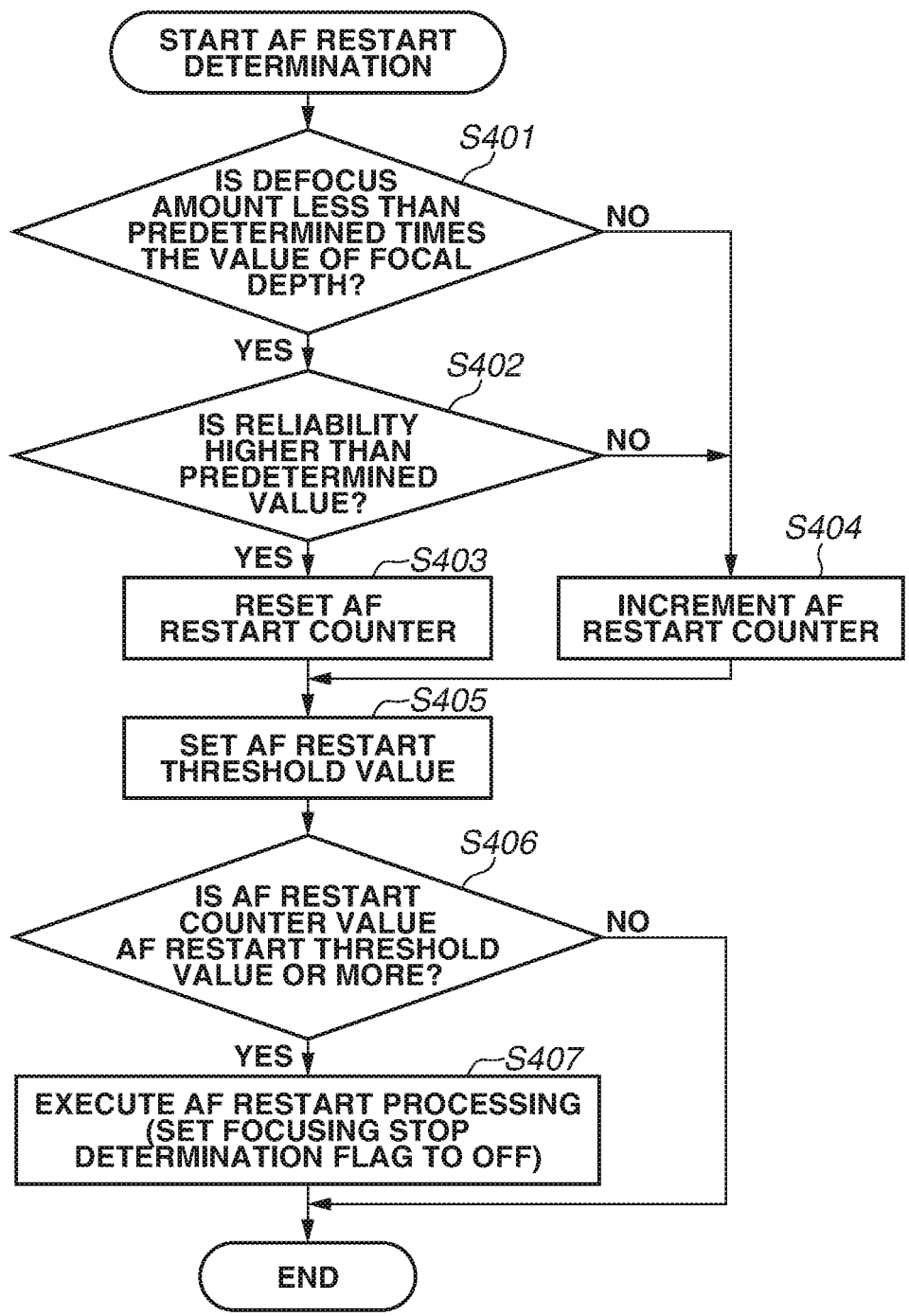
FIG. 4 is a flowchart illustrating autofocus (AF) restart determination according to the present exemplary embodiment.

Next, AF restart determination executed in step S307 will be described with reference to the flowchart in FIG. 4. The AF restart determination is executed when the camera control unit 212 determines that the focus mode is the default mode in step S306 of FIG. 3. In the AF restart determination, the camera control unit 212 executes processing of determining whether to drive the focus lens 103 again in a state where the focus lens 103 is stopped in an in-focus state.

In step S401, the camera control unit 212 determines whether the calculated defocus amount is less than a predetermined value. If the defocus amount is less than the predetermined value (YES in step S401), the processing proceeds to step S402. If the defocus amount is the predetermined value or more (NO in step S401), the processing proceeds to step S404. The threshold value of the defocus amount set in step S401 is a value with which the focus lens 103 can be restarted easily if a main object is changed, and cannot be restarted easily and improperly if the main object is not changed. In the present exemplary embodiment, a value that is 1-time the value of the focal depth where defocusing of the main object starts to be recognized is set as the threshold value.

In step S402, the camera control unit 212 determines whether the calculated reliability is higher than a predetermined value. If the reliability is higher than the predetermined value (YES in step S402), the processing proceeds to step S403. If the reliability is the predetermined value or lower (NO in step S402), the processing proceeds to step S404. The threshold value of reliability set in step S402 is a value with which change of the main object may be presumed. Thus, for example, a value having low reliability, by which a defocus direction is hardly considered as reliable, may be set as the threshold value thereof. As described above, based on the threshold values set in steps S401 and S402, the camera control unit 212 determines whether the main object is changed.

In step S403, an AF restart counter is reset, and the processing proceeds to step S405. In step S404, the AF restart counter is incremented, and the processing proceeds to step S405. As described above, in a case where the defocus amount is a predetermined value or more or in a case where the reliability is a predetermined value or lower, there is a possibility that the main object being captured is changed. Thus, the camera control unit 212 increments the AF restart counter in step S404 to prepare for AF restart processing. If the detected defocus amount is less than a predetermined value and high reliability is maintained, in step S403, the camera control unit 212 resets the AF restart counter to continue to stop the focus lens 103.

Next, in step S405, the camera control unit 212 sets an AF restart threshold value. Then, the processing proceeds to step S406. The camera control unit 212 sets the response time determined in step S303 as the AF restart threshold value in step S405.

After the AF restart threshold value is set in step S405, in step S406, the camera control unit 212 determines whether a value of the AF restart counter is the AF restart threshold value or more. If the counter value is the AF restart threshold value or more (YES in step S406), the processing proceeds to step S407. If the counter value is less than the AF restart threshold value (NO in step S406), the processing is ended. In step S407, the camera control unit 212 sets the focusing stop determination flag to OFF, executes the AF restart processing, controls the focus lens 103 to start driving again, and ends the processing.

In order to execute the AF restart processing, in step S406, the camera control unit 212 determines whether the AF restart counter incremented in step S404 is greater than the threshold value set in step S405.

<AF Processing in Rack-Focus Mode>

Figure 5:
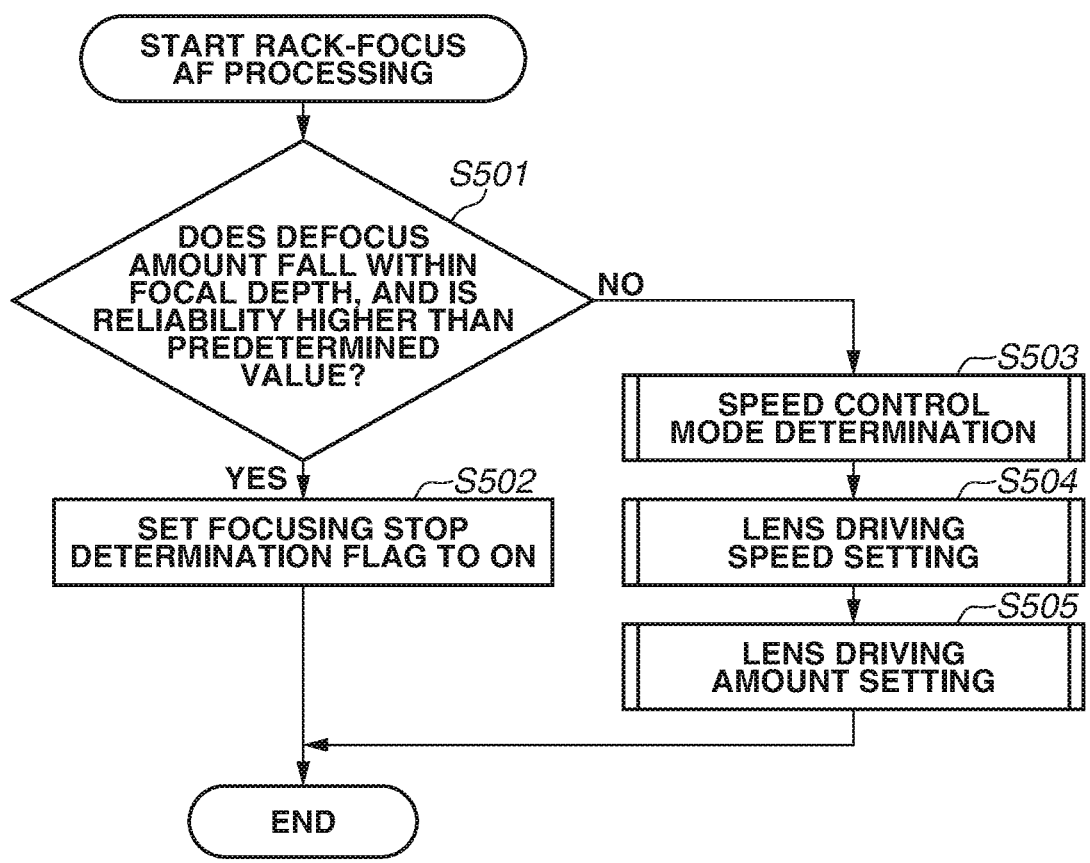
FIG. 5 is a flowchart illustrating rack-focus mode AF processing according to the present exemplary embodiment.

Next, the AF processing in step S309 of FIG. 3 will be described with reference to the flowchart in FIG. 5. In the rack-focus AF processing, driving of the focus lens 103 is executed in a state where focusing is not stopped, and focusing stop determination is executed.

In step S501, the camera control unit 212 determines whether the defocus amount falls within a focal depth and the reliability is higher than a predetermined value. If the above condition is satisfied (YES in step S501), the processing proceeds to step S502. If the above condition is not satisfied (NO in step S501), the processing proceeds to step S503. In the present exemplary embodiment, a threshold value used in step S501 is a value 1-time of the value of the focal depth. However, a value greater or less than the above value can be set as the threshold value as necessary.

In step S502, the camera control unit 212 sets the focusing stop determination flag to ON and ends the processing.

In step S503, the camera control unit 212 determines a speed control mode. Then, the processing proceeds to step S504. Speed control mode determination processing will be described later with reference to FIG. 12.

In step S504, the camera control unit 212 executes lens driving speed setting processing. Then, the processing proceeds to step S505. The lens driving speed setting processing will be described later with reference to FIG. 6.

In step S505, the camera control unit 212 drives the focus lens 103 and ends the control processing. Lens driving amount setting processing will be described later with reference to FIG. 7.

<Overview of Speed Control Mode>

First, overview of a speed control mode will be described with reference to FIG. 15.

Figure 15:
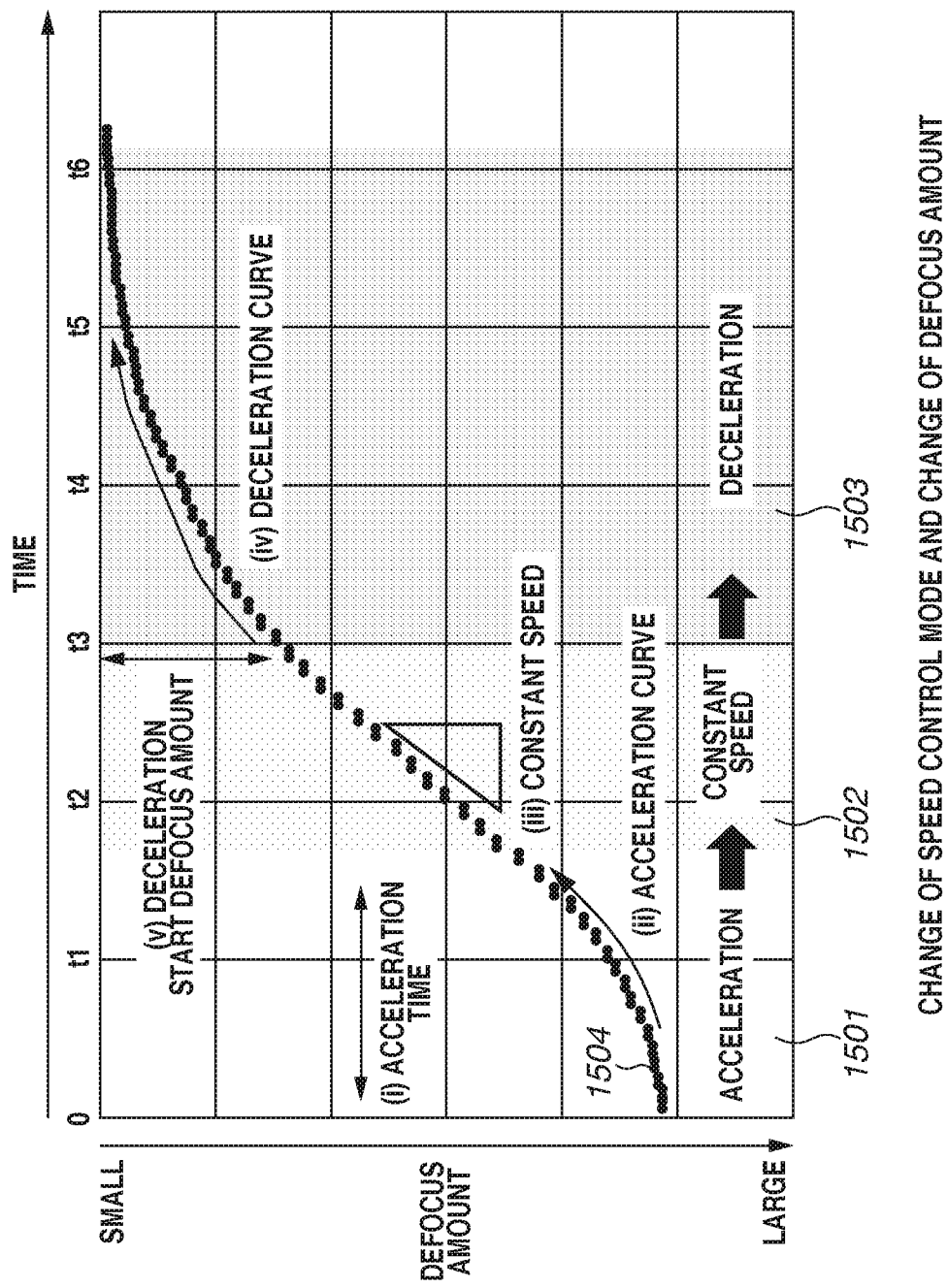
FIG. 15 is a diagram illustrating change of a speed control mode and change of a defocus amount according to the present exemplary embodiment.

FIG. 15 is a graph illustrating change of the speed control mode and change of a defocus amount. A vertical axis represents the defocus amount, and a horizontal axis represents time.

The speed control mode (speed control pattern) includes the following three modes:
an acceleration control mode,
a constant speed control mode, and
a deceleration control mode.

An acceleration time 1501 represents duration of acceleration control, a constant speed time 1502 represents duration of constant speed control, and a deceleration time 1503 represents duration of deceleration control. A curve 1504 expresses change in the defocus amount caused by lens driving operation. The curve 1504 indicates that the focus lens 103 is in an in-focus state when the defocus amount is 0.

The following five control parameters are used to execute lens control in the above-described control modes:
i. acceleration time,
ii. acceleration curve,
iii. constant speed,
iv. deceleration curve, and
v. deceleration start defocus amount.

FIG. 15 is a diagram illustrating how the above-described parameters affect the change in the defocus amount of the lens. In the lens driving operation, importance is placed on a balance between the deceleration time, the constant speed time, and the acceleration time. In one embodiment, the deceleration time is to be set to be comparatively longer than the other two.

Figure 16:
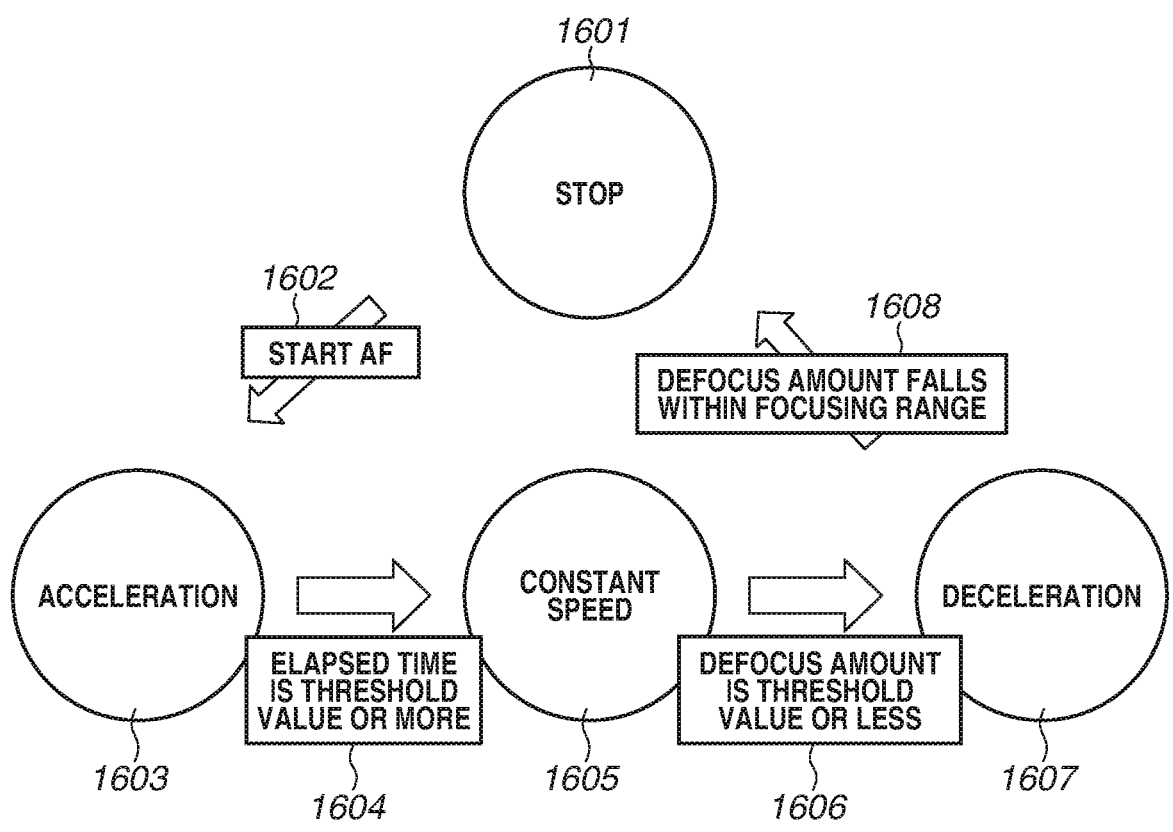
FIG. 16 is a state transition diagram of the speed control mode according to the present exemplary embodiment.

Next, state transition between the above-described three speed control modes will be described with reference to FIG. 16.

A stopped state of the lens is expressed by a state 1601. The stopped state 1601 is shifted to an acceleration control mode 1603 upon an AF start instruction 1602. The acceleration control mode 1603 is shifted to a constant speed control mode 1605 if an elapsed time is a threshold value or more 1604. The constant speed control mode 1605 is shifted to a deceleration control mode 1607 if the defocus amount is a threshold value or less 1606. The deceleration control mode is shifted to the stopped state 1601 if the defocus amount falls within a focusing range 1608. As described above, in a case where the acceleration control mode 1603 is shifted to the constant speed control mode 1605, time act as a trigger for the state transition, and in a case where the constant speed control mode 1605 is shifted to the deceleration control mode 1607, the defocus amount act as a trigger for the state transition.

Originally, the state transition is to be executed by using the defocus amount as a trigger. However, at the start of AF, an object may be defocused because a distance to an in-focus position is long, and contrast may be low. Thus, there is a case where the defocus amount cannot be acquired. Even in a case where the defocus amount can be acquired, if an acceleration control time is changed depending on acquisition of the defocus amount, this may give the user an impression that the lens is not stably controlled. Thus, in one embodiment, the state transition in an acceleration control is to be managed by time.

On the other hand, a deceleration control is executed only near the in-focus position. Thus, the defocus amount can be acquired because the object is relatively less defocused, and the state transition is executed depending on the defocus amount.

As described above, since the state transition is executed based on the time and the defocus amount, an AF control can be executed stably regardless of a state of the object.

<Speed Control Mode Setting>

Figure 12:
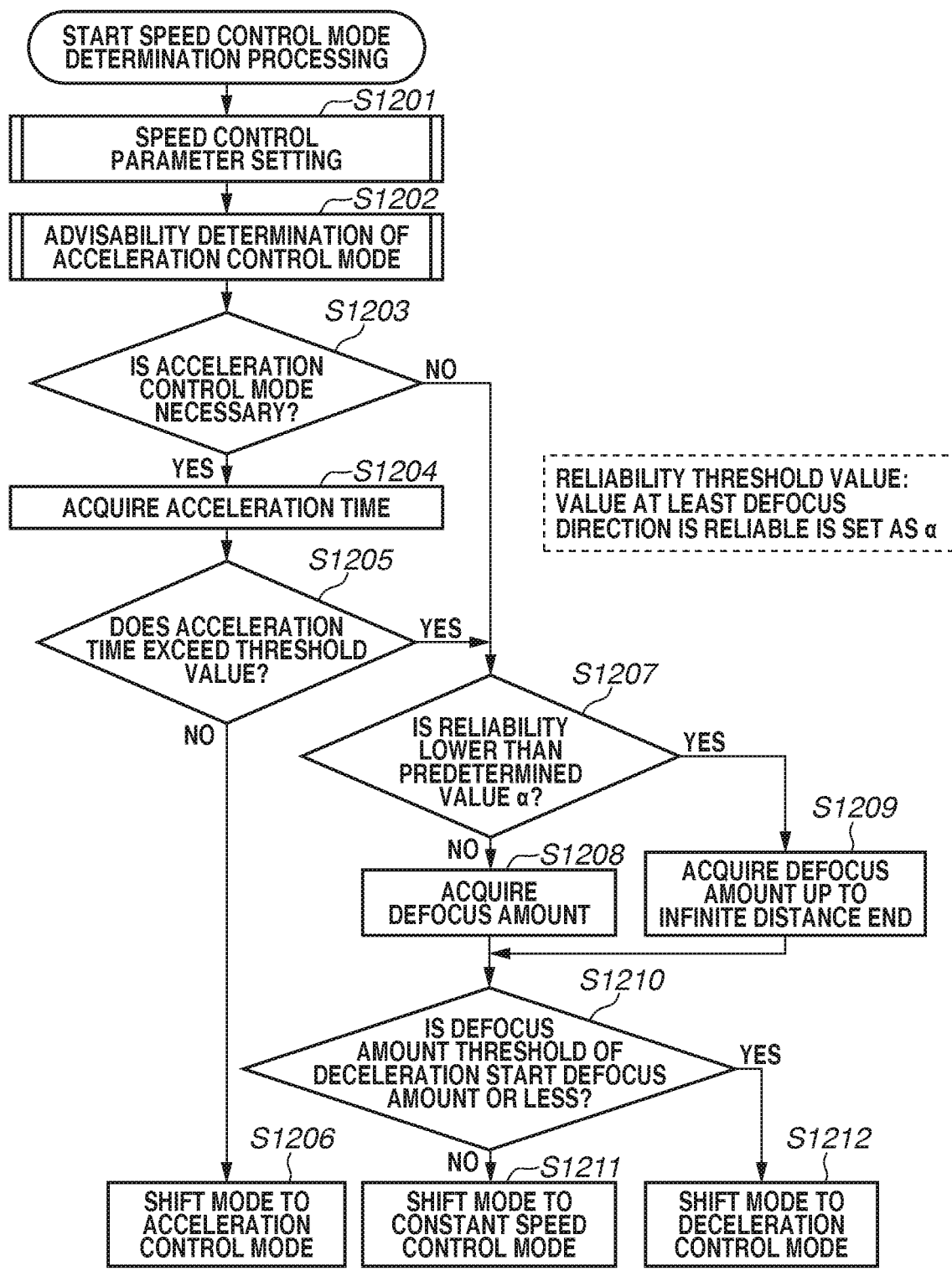
FIG. 12 is a flowchart illustrating speed control mode determination processing according to the present exemplary embodiment.

Next, the speed control mode determination in step S503 of FIG. 5 will be described with reference to the flowchart in FIG. 12.

In step S1201, the camera control unit 212 sets the parameters for executing speed control. Then, the processing proceeds to step S1202. Setting of the speed control parameters will be described with reference to FIG. 13. In step S1202, the camera control unit 212 determines advisability of the acceleration control mode. Then, the processing proceeds to step S1203. Determination of the advisability of the acceleration control mode will be described below with reference to FIG. 14. In step S1203, the camera control unit 212 determines whether the acceleration control mode is necessary. If the acceleration control mode is necessary (YES in step S1203), the processing proceeds to step S1204. If the acceleration control mode is not necessary (NO in step S1203), the processing proceeds to step S1207. In step S1204, the camera control unit 212 acquires acceleration time. Then, the processing proceeds to step S1205. In step S1205, the camera control unit 212 determines whether the acceleration time exceeds a threshold value (predetermined time) set in step S1303. If the acceleration time does not exceed the threshold value (NO in step S1205), the processing proceeds to step S1206. If the acceleration time exceeds the threshold value (YES in step S1205), the processing proceeds to step S1207.

In step S1206, the camera control unit 212 shifts the speed control mode to the acceleration control mode and ends the control processing. In step S1207, the camera control unit 212 determines whether reliability of defocusing is lower than a predetermined value a. If the reliability is not lower than the predetermined value a (NO in step S1207), the processing proceeds to step S1208. If the reliability is lower than the predetermined value a (YES in step S1207), the processing proceeds to step S1209.

In step S1208, the defocus amount is acquired, and the processing proceeds to step S1210.

In step S1209, the defocus amount up to an infinite distance end is acquired, and the processing proceeds to step S1210. Processing in steps S1207 to S1209 is characterizing processing that enables the deceleration control to be started even in a case where an imaging target is an object from which the defocus amount is not acquirable. The processing will be described later with reference to FIG. 22.

In step S1210, the camera control unit 212 determines whether the acquired defocus amount is a threshold value of a deceleration start defocus amount or less. If the acquired defocus amount is the threshold value or less (YES in step S1210), the processing proceeds to step S1212. If the acquired defocus amount is greater than the threshold value (NO in step S1210), the processing proceeds to step S1211.

In step S1211, the constant speed control mode is set as the speed control mode, and the processing is ended. In step S1212, the deceleration control mode is set as the speed control mode, and the processing is ended.

<Deceleration Control when Defocus Amount Cannot be Acquired>

Next, the processing in steps S1207 to S1209 will be described with reference to FIG. 22.

FIG. 22 is a diagram illustrating the deceleration control executed when the defocus amount cannot be acquired. A vertical axis represents a defocus amount, and a horizontal axis represents time.

Ideal change in a defocus amount is expressed by a curve 2200. A deceleration start defocus amount is indicated by a solid line 2201. A position where a defocus amount from an end of a lens movable range is equal to the deceleration start defocus amount is indicated by a solid line 2202. A position where a defocus amount can be actually acquired is indicated by a solid line 2203. An in-focus position is indicated by a dashed line 2204. The end of the lens movable range is expressed by a shaded portion 2205. With respect to an object (with high contrast) from which the defocus amount can be acquired, deceleration can be started when the defocus amount has reached the deceleration start defocus amount indicated by the solid line 2201. Thus, it is possible to secure sufficient deceleration time. However, for example, with respect to an object (with low contrast) from which the defocus amount cannot be acquired or can only be acquired at the position indicated by the solid line 2203 near the in-focus position 2204, the lens is brought into an in-focus state without having sufficient deceleration time.

Thus, deceleration is started at the position indicated by the solid line 2202 where the defocus amount from the end of the lens movable range is equal to the deceleration start defocus amount, so that the deceleration time can be secured.

The processing is effective for a scene having a low-contrast object at an infinite distance end position. Conventionally, the lens has been stopped at in-focus position before the driving speed is decelerated sufficiently. However, by using the defocus amount from the end of the lens movable range, the deceleration control can be started at a position more distant from the in-focus position to some extent, compared to conventional techniques. As a result, in a lens control from the beginning of deceleration until the lens is stopped, seamless rack-focusing for smoothly shifting to an in-focus state and a smooth autofocusing operation which makes a viewer feel comfortable can be realized.

<Speed Control Parameter Setting>

Figure 13:
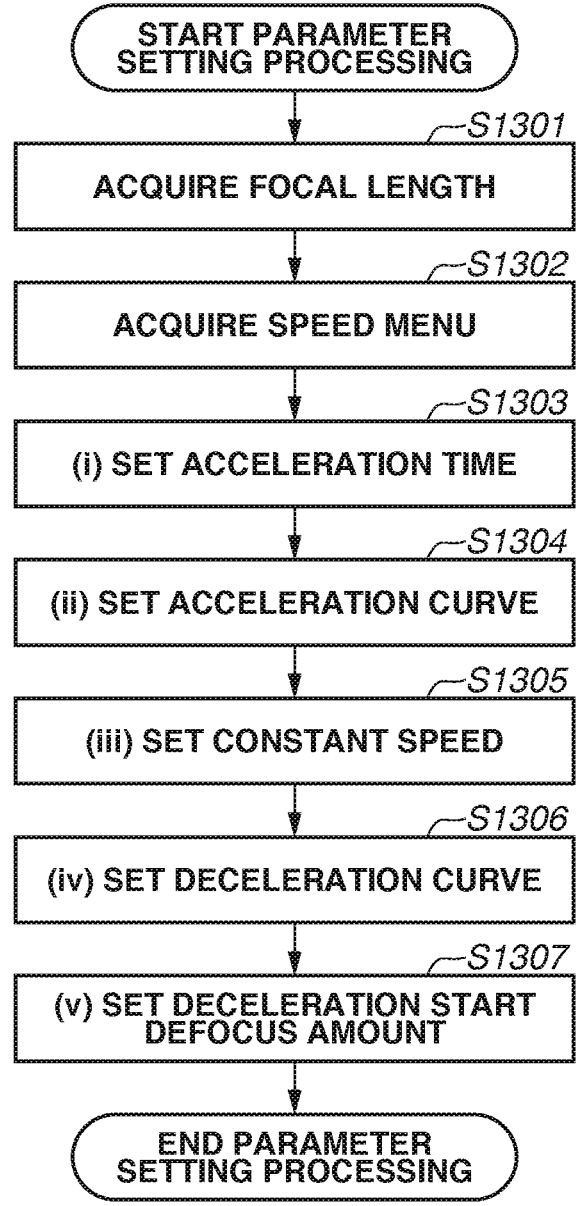
FIG. 13 is a flowchart illustrating speed control parameter setting processing according the present exemplary embodiment.

Next, speed control parameter setting in step S1201 of FIG. 12 will be described with reference to FIG. 13. In step S1301, a focal length is acquired. Then, the processing proceeds to step S1302. In the present exemplary embodiment, as the focal length, a position of a zoom lens that can be acquired from the zoom lens 101 is acquired via the lens control unit 106. In step S1302, a speed menu is acquired from the camera control unit 212. Then, the processing proceeds to step S1303. For example, the user can select a driving speed of the focus lens 103 for imaging operation to execute speed setting on a menu screen (not illustrated) of the camera 20. By changing the speed setting, a speed of the focus lens 103 is changed, acceleration time and time of deceleration control are changed, and time taken for achieving an in-focus state is changed.

In step S1303 to S1307, the speed control parameter setting processing will be described.

In step S1303, processing for setting the acceleration time as a first parameter is executed. Then, the processing proceeds to step S1304. The processing for setting the acceleration time as the first parameter will be described later with reference to FIG. 18. In step S1304, processing for setting the acceleration curve as a second parameter is executed. Then, the processing proceeds to step S1305. The processing for setting the acceleration curve as the second parameter will be described later. In step S1305, processing for setting the constant speed as a third parameter is executed. Then, the processing proceeds to step S1306. The processing for setting the constant speed as the third parameter will be described later with reference to FIG. 19. In step S1306, processing for setting the deceleration curve as a fourth parameter is executed. Then, the processing proceeds to step S1307. The processing for setting the deceleration curve as the fourth parameter will be described later with reference to FIG. 20.

In step S1307, processing for setting the deceleration start defocus amount as a fifth parameter is executed, and the parameter setting is ended. The processing for setting the deceleration start defocus amount as the fifth parameter will be described later with reference to FIG. 21.

<Gain Setting of Control Parameter>

A value of each of the above-described parameters is changed only by the focal distance and the speed menu. It is notable that the value is not changed by the aperture, the contrast, or the like.

Figure 17:
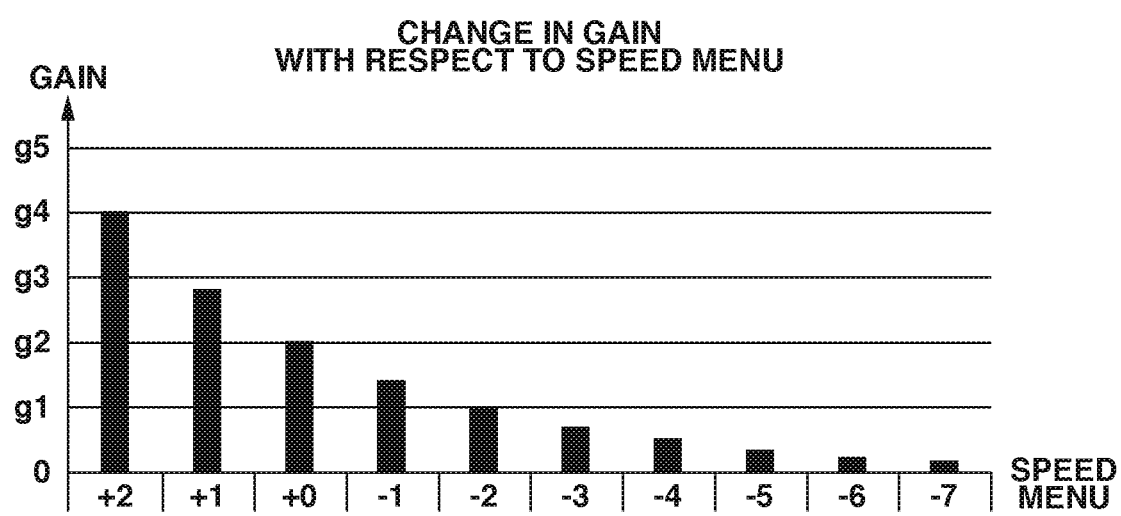
FIG. 17 is a graph illustrating change of setting gain depending on a speed menu according to the present exemplary embodiment.

First, change in gain with respect to the speed menu will be described with reference to FIG. 17. A horizontal axis represents a speed menu (+2 to −7), and a vertical axis represents gain. As illustrated in FIG. 17, gain is increased when a speed setting is high, and the gain is decreased when the speed setting is low. It is notable that the gain on the low-speed side is set more finely than the gain on the high-speed side.

<Set First Parameter: Acceleration Time>

Figure 18:
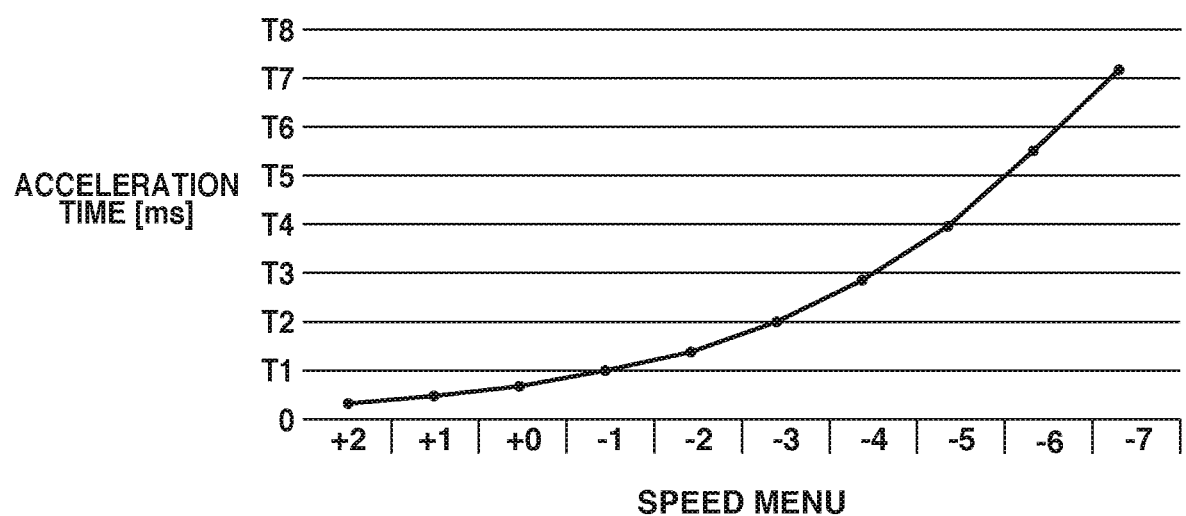
FIG. 18 is a graph illustrating change of an acceleration time depending on the speed menu according to the present exemplary embodiment.

A setting method of an acceleration time ACCEL_TIME will be described with reference to FIG. 18. A horizontal axis represents the speed menu, and a vertical axis represents the acceleration time.

The acceleration time is a parameter that is changed with respect to the speed menu. The acceleration time becomes shorter when a setting value of the speed menu is greater, and the acceleration time becomes longer when a value thereof is smaller. A standard setting is multiplied by the gain corresponding to the setting value of the speed menu in FIG. 17, so that the acceleration time is changed at a different rate.

In the actual control processing, an acceleration time table is created in advance, and the acceleration time ACCEL_TIME is set with reference to data described in the speed menu. In the present exemplary embodiment, speed is set as illustrated in FIG. 18. However, this is merely an example, and the exemplary embodiment is not limited thereto.

<Set Second Parameter: Acceleration Curve>

An acceleration curve is a setting value that is determined by an amount of change in the speed (acceleration ACCEL_SPD) in the acceleration control.

The acceleration is obtained by the following formula.

Acceleration ACCEL_SPD [mm/s$^2$]=Constant Speed CONST_SPD [mm/s]/Acceleration Time ACCEL_TIME [s]  (3)

The actual setting speed is obtained by the following formula.

Setting Speed SPD [mm/s]=Acceleration Elapsed Time ACCEL_TIME_P [s]×Acceleration ACCEL_SPD [mm/s$^2$]  (4)

In the present exemplary embodiment, the acceleration is set to increase at a certain rate by dividing the constant speed by the acceleration time. However, this is merely an example, and the exemplary embodiment is not limited thereto.

<Set Third Parameter: Constant Speed>

A setting method of the constant speed CONST_SPD will be described with reference to FIG. 19. A horizontal axis represents a focal length, and a vertical axis represents a driving speed (constant speed) of the lens. The constant speed is changed with respect to the speed menu and the focal length. A line 1901 is a graph when the speed setting is +2, and a line 1902 is a graph when the speed setting is −7. A standard setting is multiplied by the gain corresponding to the setting value of the speed menu in FIG. 17, so that the constant speed is changed at a different rate. The constant speed is changed depending on the focal length, and is set to be slower on a wide-angle side and faster on a telephoto side. A line 1903 indicates that an upper limit is set to the constant speed at a focal length of a certain value or greater. Because a driving speed of the lens has a limitation, the constant speed is set to fall within the range of the driving speed of the lens.

A line 1904 indicates that a lower limit is set to the constant speed at a focal length of a certain value or less. Because it will take a long time to bring the lens into an in-focus state if the constant speed is too slow, a lower limit is set to the constant speed in order to place an importance on a balance between smoothness of lens driving and focusing time.

In the actual control processing, a table of the constant speed CONST_SPD is created in advance, and the constant speed CONST_SPD is set with reference to the data described in the speed menu and the focal length.

<Set Fourth Parameter: Deceleration Curve>

A setting method of the deceleration curve will be described with reference to FIG. 20. A coefficient DECEL_PARAM of the deceleration curve is a parameter that is changed with respect to the speed menu. A coefficient of the deceleration curve is set to be smaller when a setting value of the speed menu is greater, and the coefficient of the deceleration curve is set to be greater when the setting value thereof is smaller. A standard setting is multiplied by the gain corresponding to the setting value of the speed menu in FIG. 17, so that the deceleration curve coefficient is changed at a different rate.

In the actual control processing, a table of the coefficient of the deceleration curve is created in advance, and the coefficient DECEL_PARAM of the deceleration curve is set with reference to the data described in the speed menu.

A setting speed is calculated by the following formula using the coefficient DECEL_PARAM of the deceleration curve.

Setting Speed SPD [mm/s]=Defocus Amount [mm]/ (Control Cycle [s]×Coefficient DECEL_PARAM of the Deceleration Curve)  (5)

As described above, by dividing the calculated defocus amount by the coefficient DECEL_PARAM of the deceleration curve, the setting speed is decreased with a distance to the in-focus position, so that a smooth deceleration curve can be acquired.

In the present exemplary embodiment, the deceleration curve is set by dividing the calculated defocus amount by the coefficient of the deceleration curve. However, this is merely an example, and the exemplary embodiment is not limited thereto.

<Set Fifth Parameter: Deceleration Start Defocus Amount>

A setting method of a deceleration start defocus amount DECEL_TH will be described with reference to FIG. 21. The deceleration start defocus amount is calculated by the following formula.

Deceleration Start Defocus Amount DECEL_TH [μm]=Constant Speed CONST_SPD [μm/s]× (Control Cycle [s]×Coefficient DECEL_PARAM of Deceleration Curve)  (6)

Since the deceleration start defocus amount is affected by range-finding performance of the imaging plane phase difference, in one embodiment, a value thereof is to be as small as possible. However, if a small value is actually set thereto, smoothness of lens driving will be lost because the deceleration time is shortened. The deceleration start defocus amount is a parameter that depends on the constant speed and the coefficient of the deceleration curve. Thus, the constant speed and the coefficient of the deceleration curve are adjusted so that lens driving can be executed smoothly.

Further, generally, deceleration is started at a timing when the defocus amount is acquired. However, in such a case, a range in which the defocus amount can be acquired varies depending on the contrast of the object, so that the AF control cannot be executed stably. Thus, a value acquirable from the object with low contrast is set as a value of the deceleration start defocus amount, so that stability of the AF control can be improved.

<Adjustment of Deceleration Time and Acceleration Time>

In order to execute lens driving smoothly, importance is placed on a balance between the deceleration time and the acceleration time. Thus, in one embodiment, a parameter that satisfies a condition "Acceleration Time<Deceleration Time" is set by calculating the acceleration time and the deceleration time from the above-described parameters.

A deceleration time DECEL_TIME can be calculated by the method described below.

First, a remaining defocus amount for achieving the in-focus state when the lens is driven while decelerating speed can be obtained by the following formula.

Remaining Defocus Amount DEF_REMAIN [μm] for achieving the in-focus state=Deceleration Start Defocus Amount [μm]−(Control Cycle [s]×Deceleration [μm/s])     (7)

Next, by using the remaining defocus amount DEF_REMAIN [μm] for achieving the in-focus state, the following formula is calculated recursively.

Remaining Defocus Amount DEF_REMAIN' [μm] for achieving the in-focus state=Remaining Defocus Amount DEF_REMAIN [μm] for achieving the in-focus state−(Control Cycle [s]× Deceleration [μm/s])

The number of times of control executed to obtain a value 0 as the above-described remaining defocus amount DEF_REMAIN' [μm] for achieving the in-focus state is obtained as the deceleration time DECEL_TIME.

With respect to the acceleration time, the camera control unit 212 refers to an acceleration time ACCEL_TIME set in step S1303.

In a case where the above-described times do not satisfy a condition "Acceleration Time ACCEL_TIME<Deceleration Time DECEL_TIME", the parameters are adjusted.

Further, in one embodiment, the parameters is to be adjusted so that the deceleration curve has an inclination more moderate than that of the acceleration curve when the deceleration curve and the acceleration curve are compared to each other.

<Advisability Determination of Acceleration Control Mode>

Figure 14:
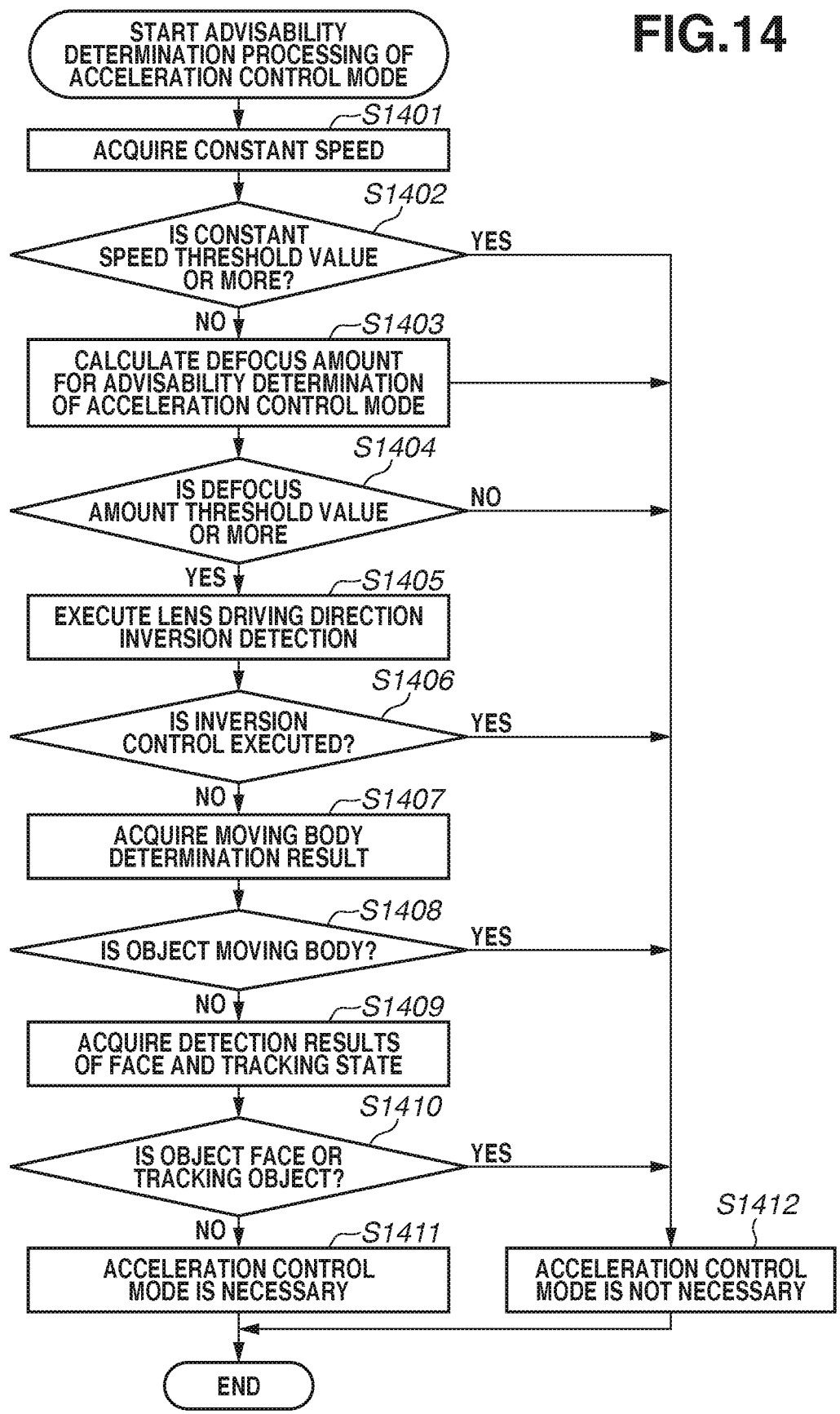
FIG. 14 is a flowchart illustrating advisability determination processing of an acceleration control mode according to the present exemplary embodiment.

Next, advisability determination of the acceleration control mode in step S1202 of FIG. 12 will be described with reference to the flowchart in FIG. 14. A purpose of a series of controls is to determine whether the user prioritizes the focusing time over the smoothness of lens driving and to execute the lens control desired by the user by eliminating the acceleration control.

In step S1401, the constant speed is acquired. Then, the processing proceeds to step S1402. A value set in step S1305 is acquired as the constant speed CONST_SPD.

In step S1402, the camera control unit 212 determines whether the constant speed CONST_SPD is a threshold value or more. If the constant speed CONST_SPD is less than the threshold value (NO in step S1402), the processing proceeds to step S1403. If the constant speed CONST_SPD is the threshold value or more (YES in step S1402), the processing proceeds to step S1412. In step S1412, the camera control unit 212 determines that the acceleration control is not necessary, and ends the control processing. In the present exemplary embodiment, the constant speed when the speed menu is 0 is set as the threshold value.

The processing in steps S1401 and S1402 is effective in a case where a high constant speed such as +1 or +2 of the speed menu setting is selected. This is because the user is likely to prioritize the focusing time over the smoothness of lens driving.

In step S1403, processing for calculating a defocus amount used for the advisability determination of the acceleration control mode is executed. Then, the processing proceeds to step S1404. The deceleration start defocus amount DECEL_TH set in step S1307 is acquired as the defocus amount used for the advisability determination of the acceleration control mode.

In step S1404, the camera control unit 212 determines whether the defocus amount at the start of AF is greater than or equal to the defocus amount used for the advisability determination of the acceleration control mode (i.e., deceleration start defocus amount DECEL_TH). If the defocus amount is the threshold value or more (YES in step S1402), the processing proceeds to step S1405. If the defocus amount is less than the threshold value (NO in step S1402), the processing proceeds to step S1412. In step S1412, the camera control unit 212 determines that the acceleration control is not necessary, and ends the control processing.

The processing in steps S1403 and S1404 is effective for a scene where change in a distance to the object is small. This is because the mode is immediately shifted to the deceleration control mode if speed control is started from the acceleration control mode in a case where change in the defocus amount is small, so that it will take time to bring the lens into the in-focus state. In other words, this may give the user an impression that responsiveness is poor when the object is changed.

In step S1405, processing for detecting inversion of lens driving direction is executed. Then, the processing proceeds to step S1406. The inversion of lens driving direction is detected by detecting inversion of a sign of the defocus amount.

In step S1406, the camera control unit 212 determines whether inversion control of lens driving direction is executed. If the inversion control is not executed (NO in step S1406), the processing proceeds to step S1407. If the inversion control is executed (YES in step S1406), the processing proceeds to step S1412. In step S1412, the camera control unit 212 determines that the acceleration control is not necessary, and ends the control processing.

The processing in steps S1405 and S1406 is effective in a case where the in-focus position of the object is changed in a direction opposite to a driving direction when focusing operation of the lens is being executed. This is because it will take time to bring the lens into the in-focus state if the speed control is started from the acceleration control mode when lens driving direction is being inverted. In other words, this may give the user an impression that responsiveness is poor when the object is changed.

In step S1407, a result of moving body determination is acquired. Then, the processing proceeds to step S1408. With respect to the result of moving body determination, the camera control unit 212 refers to a result of the moving body determination flag.

In step S1408, the camera control unit 212 determines whether the object is a moving body. If the object is not the moving body (NO in step S1406), the processing proceeds to step S1409. If the object is the moving body (YES in step S1406), the processing proceeds to step S1412. In step S1412, the camera control unit 212 determines that the acceleration control is not necessary, and ends the control processing. The processing in steps S1407 and S1408 is effective in a case where the object is the moving body. Because the object is the moving body, it will take time to bring the lens into the in-focus state if the speed control is started from the acceleration control mode when lens driving is being executed. In other words, in a case where a speed of the moving body is high, the object cannot be brought into focus when the speed control is executed in the acceleration control mode. This may give the user an impression that responsiveness to the moving body is poor.

In step S1409, detection results of the face and the tracking state are acquired. Then, the processing proceeds to step S1410. Detection results acquired by the face detection unit 216 and the tracking processing unit 217 are acquired as the detection results of the face and the tracking state.

In step S1410, the camera control unit 212 determines whether the object is the face or the tracking object. If the object is neither the face nor the tracking object (NO in step S1410), the processing proceeds to step S1411. In step S1411, the camera control unit 212 determines that the acceleration control is necessary and ends the processing. If the object is either the face or the tracking object (YES in step s1410), the processing proceeds to step S1412. In step S1412, the camera control unit 212 determines that the acceleration control is not necessary, and ends the control processing.

The processing in steps S1409 and S1410 is effective in a case where the object is either the face or the tracking object. This is because of the following reasons. Similar to the case of the moving body, in the case where the object is either the face or the tracking object, and the speed of the object is high, the object cannot be brought into focus when the speed control is being executed in the acceleration control mode.

<Lens Driving Speed Setting>

Figure 6:
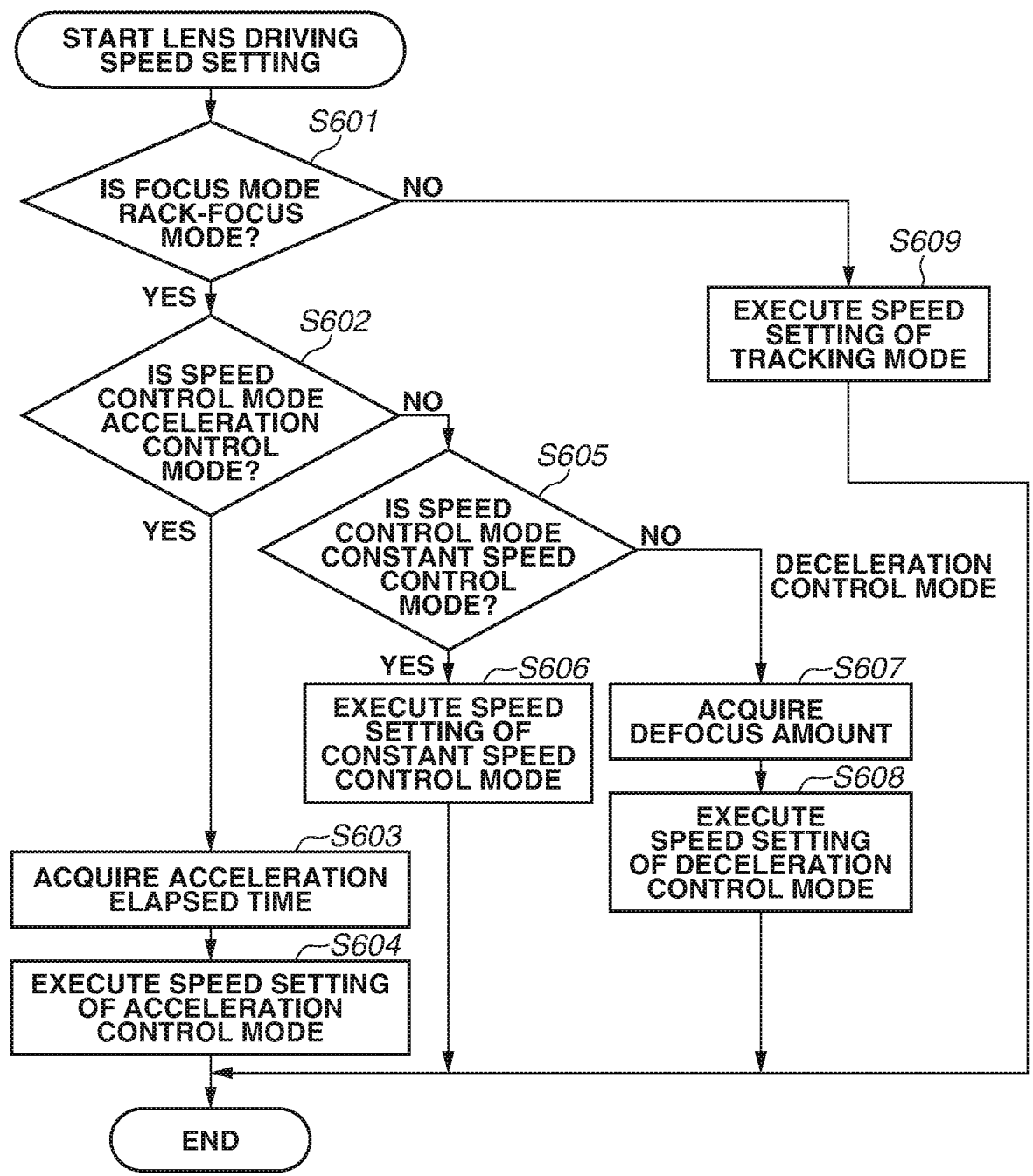
FIG. 6 is a flowchart illustrating lens driving speed setting processing according to the present exemplary embodiment.

Next, setting of the lens driving speed executed in step S504 of FIG. 5 will be described with reference to the flowchart in FIG. 6.

In step S601, the camera control unit 212 determines whether the focus mode is the rack-focus mode. If the focus mode is the rack-focus mode (YES in step S601), the processing proceeds to step S602. If the focus mode is not the rack-focus mode (NO in step S601), the processing proceeds to step S609.

In step S602, the camera control unit 212 determines whether the speed control mode is the acceleration control mode. If the speed control mode is the acceleration control mode (YES in step S602), the processing proceeds to step S603. If the speed control mode is not the acceleration control mode (NO in step S602), the processing proceeds to step S605.

In step S603, the acceleration elapsed time ACCEL_TIME_P is acquired. Then, the processing proceeds to step S604.

In step S604, speed setting of the acceleration control mode is executed, and the control processing is ended. The setting speed SPD calculated using the acceleration elapsed time ACCEL_TIME_P and the speed menu in step S1304 is set as the speed for the acceleration control mode.

In step S605, the camera control unit 212 determines whether the speed control mode is the constant speed control mode. If the speed control mode is the constant speed control mode (YES in step S605), the processing proceeds to step S606. If the speed control mode is not the constant speed control mode (NO in step S605), the processing proceeds to step S607.

In step S606, speed setting of the constant speed control mode is executed, and the control processing is ended. The constant speed CONST_SPD acquired in step S1305 is set as the speed for the constant speed control mode.

In step S607, the defocus amount is acquired. Then, the processing proceeds to step S608.

In step S608, speed setting of the deceleration control mode is executed, and the control processing is ended. The setting speed SPD calculated in step S1306 is set as the speed for the deceleration control mode.

In step S609, setting of the speed when the focus mode is the tracking mode is executed. Then, the control processing is ended. In order to track the moving body, a speed that is equal to the speed of the moving body is set as the speed for the tracking mode.

<Lens Driving Amount Setting Processing>

Figure 7:
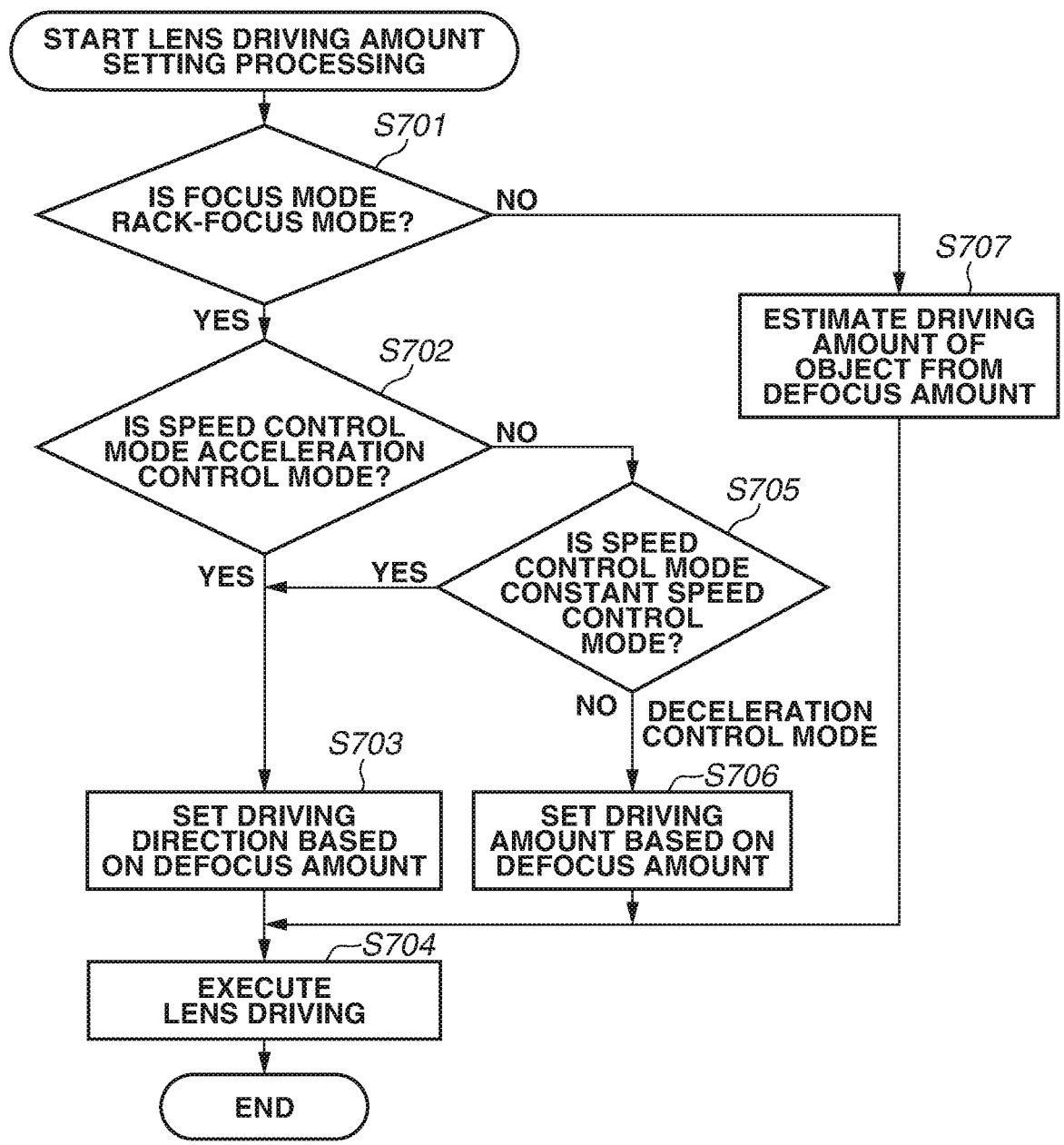
FIG. 7 is a flowchart illustrating lens driving amount setting processing according to the present exemplary embodiment.

Next, the lens driving amount setting processing in step S505 of FIG. 5 will be described with reference to the flowchart in FIG. 7.

In step S701, the camera control unit 212 determines whether the focus mode is the rack-focus mode. If the focus mode is the rack-focus mode (YES in step S701), the processing proceeds to step S702. If the focus mode is not the rack-focus mode but the tracking mode (NO in step S701), the processing proceeds to step S707.

In step S702, the camera control unit 212 determines whether the speed control mode is the acceleration control mode. If the speed control mode is the acceleration control mode (YES in step S702), the processing proceeds to step S703. If the speed control mode is not the acceleration control mode (NO in step S702), the processing proceeds to step S705.

In step S703, a driving direction is set based on the defocus amount, and the processing proceeds to step S704. A direction of the object (the closest distance direction or the infinite distance direction) is determined based on the defocus amount, and setting of the driving direction is executed.

In one embodiment, at the start of the acceleration control, only the direction to the object is necessary, and a highly-reliable defocus amount which can be used for specifying the in-focus position is not necessary.

In a case where the driving direction cannot be determined because the object has low contrast and reliability of the defocus amount is low, a closest distance priority method may be adopted in which the lens is driven in the closest distance direction, or distances between the current lens position and the infinite end and between the current lens position and the closest distance end of the lens are compared, and the lens may be driven in a direction of a longer distance.

In step S704, driving of the lens is executed by using the driving amount or the driving direction determined based on the defocus amount, and then, the lens driving processing is ended.

In step S705, the camera control unit 212 determines whether the speed control mode is the constant speed control mode. If the speed control mode is the constant speed control mode (YES in step S705), the processing proceeds to step S703. If the speed control mode is not the constant speed control mode (NO in step S705), the processing proceeds to step S706.

In step S706, setting of a driving amount when the speed control mode is the deceleration control mode is executed. Then, the processing proceeds to step S704. A driving amount to the in-focus position is calculated from the defocus amount, and the calculated driving amount is taken as a driving amount for the deceleration control mode.

The in-focus position of the object has to be specified when deceleration control is started. Because the lens has been driven to a position near the in-focus position of the object, a target position of the lens has to be set so as not to exceed the in-focus position.

In step S707, the camera control unit 212 estimates the driving amount of the object from the defocus amount and sets the estimated driving amount. Then, the processing proceeds to step S704.

<Tracking Mode AF Processing>

Figure 11:
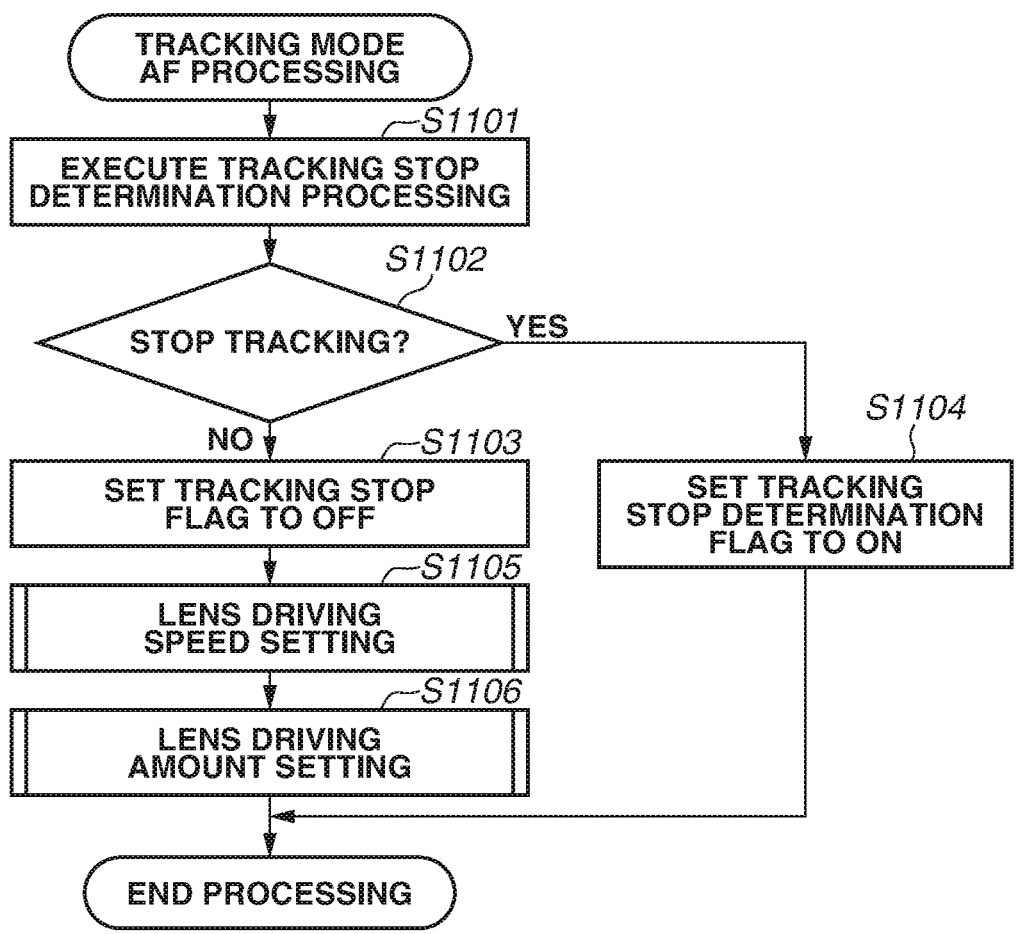
FIG. 11 is a flowchart illustrating tracking mode AF processing according to the present exemplary embodiment.

Next, the tracking mode AF processing will be described with reference to FIG. 11. The tracking mode AF processing is the AF processing executed in the tracking mode.

In step S1101, tracking stop determination processing is executed. The processing is processing for determining whether or not to stop tracking, and the camera control unit 212 determines whether the tracking object is stopped based on a change in the defocus amount. In the present exemplary embodiment, description of this processing is omitted as it is not related to the effect of the disclosure. Details thereof can be found in FIGS. 14, 15, and 16 of Japanese Patent Laid-Open No. 2018-36509.

In step S1102, the camera control unit 212 determines whether the tracking is to be stopped. If the tracking is to be stopped (YES in step S1102), the processing proceeds to step S1104. In step S1104, the camera control unit 212 sets the tracking stop determination flag to ON, and ends the processing of this flowchart. If the tracking is not to be stopped (NO in step S1102), the processing proceeds to step S1103. In step S1103, the camera control unit 212 sets the tracking stop determination flag to OFF. Then, the processing proceeds to step S1105.

In step S1105, the camera control unit 212 executes lens driving speed setting processing similar to the processing executed in step S504. In step S1106, the camera control unit 212 executes lens driving amount setting processing similar to the processing executed in step S505 and ends the processing of this flowchart.

In the above-described exemplary embodiment, in comparison to the conventional technique, it is possible to realize seamless rack-focusing for smoothly shifting a focus from one to another and a smooth autofocusing operation which makes a viewer feel comfortable, regardless of a result of focus detection, in lens control in a period from the beginning to the end of autofocusing operation.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-153208, No. 2019-153206, and No. 2019-153207, filed Aug. 23, 2019, which are hereby incorporated by reference herein in their entirety.

What is claimed is:

1. An apparatus comprising:
   at least one processor programmed to perform operations of the following units:
   a focus detection unit configured to detect a defocus amount; and
   a control unit configured to control a focus lens to move based on the defocus amount,
   wherein the control unit includes three speed control patterns of acceleration control, constant speed control, and deceleration control, and the speed control patterns are changed based on two or more parameters,
   wherein, in the acceleration control, duration of the acceleration control is changed depending on a predetermined time,
   wherein, in the deceleration control, duration of the deceleration control is changed depending on a deceleration coefficient, and
   wherein the predetermined time and the deceleration coefficient are changed so that the duration of the deceleration control becomes longer than the duration of the acceleration control.

2. The apparatus according to claim 1, wherein the speed control patterns are shifted from the acceleration control to the constant speed control in a case where the duration of the acceleration control exceeds a predetermined time.

3. The apparatus according to claim 1, wherein the speed control patterns are shifted from the constant speed control to the deceleration control in a case where the defocus amount is less than a predetermined value.

4. The apparatus according to claim 1, wherein the speed control patterns are shifted from the constant speed control to the deceleration control in a case where a distance to the infinite distance end is less than a predetermined value.

5. The apparatus according to claim 1, wherein the control unit controls speed based on duration of the acceleration control in a case where the acceleration control is executed, controls speed at a predetermined speed in a case where the constant speed control is executed, and controls speed based on the defocus amount in a case where the deceleration control is executed.

6. The apparatus according to claim 1, wherein the focus detection unit detects the defocus amount based on a pair of signals generated by photoelectric conversion of light fluxes having passed through different pupil regions of an imaging optical system.

7. The apparatus according to claim 6, wherein the imaging optical system includes a zoom lens and a focus lens.

8. The apparatus according to claim 1, wherein the focus detection unit detects the defocus amount based on a signal output from an image sensor including micro lenses arrayed two-dimensionally, each of the micro lenses corresponding to a plurality of photoelectric conversion elements.

9. The apparatus according to claim 1,
wherein the constant speed control is shifted to the deceleration control in a case where the defocus amount is less than a predetermined value, and
wherein the predetermined value is changed depending on a focal length.

10. The apparatus according to claim 1, wherein a predetermined value is a fixed value in a case where a focal length is a first length or more and in a case where the focal length is a second length or less.

11. A control method of an apparatus comprising:
detecting a defocus amount through focus detection; and
controlling a focus lens to move based on the defocus amount,
wherein the controlling includes three speed control patterns of acceleration control, constant speed control, and deceleration control, and the speed control patterns are changed based on two or more parameters,
wherein, in the acceleration control, duration of the acceleration control is changed depending on a predetermined time,
wherein, in the deceleration control, duration of the deceleration control is changed depending on a deceleration coefficient, and
wherein the predetermined time and the deceleration coefficient are changed so that the duration of the deceleration control becomes longer than the duration of the acceleration control.

12. The method according to claim 11, wherein the speed control patterns are shifted from the acceleration control to the constant speed control in a case where the duration of the acceleration control exceeds a predetermined time.

13. The method according to claim 11, wherein the speed control patterns are shifted from the constant speed control to the deceleration control in a case where the defocus amount is less than a predetermined value.

14. The method according to claim 11, wherein the speed control patterns are shifted from the constant speed control to the deceleration control in a case where a distance to the infinite distance end is less than a predetermined value.

15. A non-transitory storage medium storing a program for controlling an apparatus, wherein the program executes a process via a computer, the process including:
detecting a defocus amount through focus detection; and
controlling a focus lens to move based on the defocus amount,
wherein the controlling includes three speed control patterns of acceleration control, constant speed control, and deceleration control, and the speed control patterns are changed based on two or more parameters,
wherein, in the acceleration control, duration of the acceleration control is changed depending on a predetermined time,
wherein, in the deceleration control, duration of the deceleration control is changed depending on a deceleration coefficient, and
wherein the predetermined time and the deceleration coefficient are changed so that the duration of the deceleration control becomes longer than the duration of the acceleration control.

16. The non-transitory storage medium according to claim 15, wherein the speed control patterns are shifted from the acceleration control to the constant speed control in a case where the duration of the acceleration control exceeds a predetermined time.

17. The non-transitory storage medium according to claim 15, wherein the speed control patterns are shifted from the constant speed control to the deceleration control in a case where the defocus amount is less than a predetermined value.

18. The non-transitory storage medium according to claim 15, wherein the speed control patterns are shifted from the constant speed control to the deceleration control in a case where a distance to the infinite distance end is less than a predetermined value.

19. An apparatus comprising:
at least one processor programmed to perform operations of the following units:
a focus detection unit configured to detect a defocus amount; and
a control unit configured to control a focus lens to move based on the defocus amount,
wherein the control unit includes three speed control patterns of acceleration control, constant speed control, and deceleration control, and the speed control patterns are changed based on two or more parameters,
wherein, in the acceleration control, duration of the acceleration control is changed depending on a predetermined time,
wherein the constant speed control is shifted to the deceleration control in a case where the defocus amount is less than a predetermined value,
wherein the predetermined time and the predetermined value are changed so that the duration of the deceleration control becomes longer than the duration of the acceleration control.

20. The apparatus according to claim 19, wherein the speed control patterns are shifted from the acceleration control to the constant speed control in a case where the duration of the acceleration control exceeds a predetermined time.

* * * * *